US012654341B2

(12) United States Patent
Yang

(10) Patent No.: US 12,654,341 B2
(45) Date of Patent: Jun. 16, 2026

(54) HANDLE HOLDER OF BLADE TOOL

(71) Applicant: Ming Yang, Alberta (CA)

(72) Inventor: Ming Yang, Alberta (CA)

( * ) Notice: Subject to any disclaimer, the term of this patent is extended or adjusted under 35 U.S.C. 154(b) by 358 days.

(21) Appl. No.: 18/529,261

(22) Filed: Dec. 5, 2023

(65) Prior Publication Data

US 2025/0178221 A1 Jun. 5, 2025

(51) Int. Cl.
*B26B 1/08* (2006.01)

(52) U.S. Cl.
CPC .................................... *B26B 1/08* (2013.01)

(58) Field of Classification Search
CPC .............. B26B 1/08; B26B 1/10; B26B 5/003
USPC .............................................. 30/2, 162, 163
See application file for complete search history.

(56) References Cited

U.S. PATENT DOCUMENTS 191,063 A * 5/1877 Manuel et al. ........... B26B 1/08 30/163
195,319 A * 9/1877 Whitehouse .............. B26B 1/08 30/163
255,847 A * 4/1882 Fiske ........................ B26B 1/08 30/163
294,471 A * 3/1884 Huff .......................... B26B 1/08 30/163
307,767 A * 11/1884 Heysinger ............... B26B 5/006 30/163
475,306 A * 5/1892 Franklin ................... B26B 1/08 30/163
515,743 A * 3/1894 Bultzingslowen ........ B26B 1/08 30/163
569,452 A * 10/1896 Gardner .................... B26B 1/08 30/163
936,592 A * 10/1909 Wilson .................... B26B 5/006 30/162
973,978 A * 10/1910 Sandford ................. B26B 1/08 30/163
1,083,095 A * 12/1913 Hermann ................. B26B 1/08 30/163
1,453,897 A * 5/1923 Vincent ..................... B26B 1/08 30/163
1,760,405 A * 5/1930 Grennan ................... B26B 1/08 30/163

(Continued)

FOREIGN PATENT DOCUMENTS

AU 2023203631 B1 * 8/2023 ............... B26B 1/08
AU 2023203633 B1 * 8/2023 ............... B26B 1/08

(Continued)

*Primary Examiner* — Jason Daniel Prone
(74) *Attorney, Agent, or Firm* — Raymond Y Chan; David & Raymond Patent Firm

(57) ABSTRACT

A handle holder of a blade tool is provided for retracting a blade to be concealed in a blade cavity of the handle holder and extending the blade out of the blade cavity for use due to gravity. The handle holder includes a locker device, a first holder member and a second holder member pivotally connected with the first holder member to define a blade cavity therebetween for receiving a blade holder slidably therein between a locking position, an unlocking position and a detaching position. The locker device is able to selectively lock relative positions of the first holder member and the second holder member with respect to each other so as to selectively lock the handle holder in the enclosing condition and the operable condition.

20 Claims, 15 Drawing Sheets

(56) References Cited

U.S. PATENT DOCUMENTS 1,768,035 A * 6/1930 Domaratius ............ F25C 5/043 30/163
2,223,422 A * 12/1940 Jones ...................... F25C 5/043 30/163
2,480,365 A * 8/1949 Harson ...................... B26B 1/08 30/163
2,591,655 A * 4/1952 Foley ........................ B26B 1/08 30/163
2,662,284 A * 12/1953 Unsinger .................. B26B 1/08 30/162
2,683,309 A * 7/1954 Unsinger ................ B26B 27/00 30/2
4,730,393 A * 3/1988 Coburn ..................... B26B 1/10 30/155
4,823,463 A * 4/1989 Lemaire .................... B26B 1/08 30/162
5,371,948 A * 12/1994 Liffiton ..................... B26B 1/08 30/162
7,086,158 B1 * 8/2006 Halpern .................... B26B 1/08 30/162
7,581,321 B2 * 9/2009 Kain ....................... B26B 1/048 30/161
7,797,835 B2 * 9/2010 Zeng ......................... B26B 1/02 30/162
8,402,663 B2 * 3/2013 McHenry .................. B26B 1/08 30/162
8,468,702 B2 * 6/2013 Doeren ................... B26B 5/003 30/162
8,595,941 B2 * 12/2013 Lee ........................... B26B 1/08 30/162
8,689,450 B2 * 4/2014 Constantine .............. B26B 1/08 30/162
8,701,293 B2 * 4/2014 Sullivan .................... B26B 1/10 30/162
9,108,323 B2 * 8/2015 Billado, Jr. ............... B26B 1/08
9,226,636 B2 * 1/2016 Landwehr ................. B26B 1/08
9,375,854 B2 * 6/2016 Chu .......................... B26B 1/08
9,579,808 B2 * 2/2017 Scimone ................. B26B 5/003
10,981,284 B2 * 4/2021 Delplanche ............... B26B 1/08
11,034,035 B2 * 6/2021 Chen ....................... B26B 5/003
11,161,260 B2 * 11/2021 Schekalla ................. B26B 1/08
11,453,135 B2 * 9/2022 Henn ...................... B26B 5/003
11,919,179 B2 * 3/2024 Eckelkamp ............... B26B 1/08
12,337,490 B2 * 6/2025 Yeh ........................... B26B 1/08
2014/0373363 A1 * 12/2014 Billado, Jr. ............... B26B 1/08 30/152
2023/0118410 A1 * 4/2023 Gallegos ................... B26B 1/08 30/162
2023/0241788 A1 * 8/2023 Wonderley ............. B26B 5/005 30/156
2025/0353197 A1 * 11/2025 Hawk ....................... B26B 1/08
2026/0001244 A1 * 1/2026 Pan ........................... B26B 1/08
2026/0054398 A1 * 2/2026 Zhu ........................... B26B 1/08

FOREIGN PATENT DOCUMENTS

CN 112171722 A * 1/2021 ............... B26B 1/08
CN 115179330 A * 10/2022 ............... B26B 1/08
CN 221211752 U * 6/2024 ............... B26B 5/00
ES 2737948 T3 * 1/2020 ............... B26B 1/08
RU 199051 U1 * 8/2020 ............... B26B 1/08

* cited by examiner

HANDLE HOLDER OF BLADE TOOL

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a blade tool which comprises a plate-type tool such as a blade of a utility knife, a cutter, and the like, and more particularly to a handle holder which is configured not only as a handle of a blade tool but also provides a gravity-telescopic configuration for retracting a blade to be concealed in a blade cavity of the handle holder and extending the blade out of the blade cavity for use due to gravity.

Description of Related Arts

Pocket knife is a common blade tool that people like to carry in pocket or with the key chain for utility purposes anytime and anywhere, especially in working environment. Referring to FIG. 1A and FIG. 1B, a conventional foldable pocket knife is illustrated, which comprises a handle holder A1 pivotally connected with a blade A2 such that the blade A2 is capable of pivotally rotating out of a blade cavity A3 for utility use (as shown in FIG. 1A) or pivotally rotating in to fold the blade A2 into the blade cavity A3 of the handle holder A1 (as shown in FIG. 1B). The drawback of this conventional foldable pocket knife is that it requires one hand to operate the folding and unfolding of the blade A2 while another hand holding the handle holder A1.

Referring to FIG. 2A and FIG. 2B, another traditional retractable pocket knife or cutter is illustrated, which comprises a handle holder B1 having a blade cavity B11 and an operation slot B12 communicating the blade cavity B11 with outside, a blade B2 sized and shaped to be received in the blade cavity B11 and a blade button B3 connected with one end of the blade B2 through the operation slot B12. By pushing the blade button B3 toward a distal end of the handle holder B1, the blade B2 is driven to extend out of the blade cavity B11 (as shown in FIG. 2A), and that by pushing the blade button B3 towards another end of the handle holder B1, the blade B2 is driven to retract into the blade cavity B11 (as shown in FIG. 2B). This type of retractable pocket knife allows the user to operate the extending and retracting of the blade B2 with one hand. However, the blade button B3 must be rotated to press against the handle holder B1 so as to lock the blade B2 in its retracted position and to prevent the blade B2 from extending out accidently that may cause unexpected injury to the user. Therefore, before operating the blade B2 to extend out, the user still has to use one hand to hold the handle holder B1 and user the other hand to unscrew and unlock the blade button B3. How to maintain the blade button B3 in its locking and unlocking positions with simple and effective configuration becomes the main hazard of designing such retractable pocket knife or cutter.

SUMMARY OF THE PRESENT INVENTION

The invention is advantageous in that it provides a handle holder which is configured not only as a handle of a blade tool but also provides a gravity-telescopic configuration for retracting a blade to be concealed in a blade cavity of the handle holder and extending the blade out of the blade cavity for use due to gravity.

Another advantage of the invention is to provide a handle holder which allows a blade to be connected therewith in a detachable and replaceable manner and is configured to allow the user to operate the extending and retracting of the blade as well as locking the blade in its extending position and retracting position with one hand.

Another advantage of the invention is to provide a handle holder which is configured to connect with a blade in such a manner that the user has no need to fold and unfold the blade for use and storage respectively nor to push the blade to extend out for use or to push the blade in to retract for storage, but simply by switching a switch on or off for operation and control of the blade with respect to the handle holder.

Another advantage of the invention is to provide a handle holder which allows the user to operate to extend or to retract the blade by means of gravity.

Another advantage of the invention is to provide a handle holder which minimizes its number of components so as to provide a simple structure with low cost.

Another advantage of the invention is to provide a handle holder with fast and effective one-hand operation, wherein the installation and replacement of the blade is also simple and easy with minimized steps.

Another advantage of the invention is to provide a handle holder of a portable knife that allows its blade to be extended out for use during an applying movement of the portable knife and to be retracted in for storage during a holding up movement of the portable knife, so that it enables the user to utilize the portable knife in a more efficient and speedy manner.

Another advantage of the invention is to provide a handle holder which is configured to have a safety arrangement that substantially and effectively prevents the blade from extending out unexpectedly or accidentally.

Additional advantages and features of the invention will become apparent from the description which follows and may be realized by means of the instrumentalities and combinations particular point out in the appended claims.

According to the present invention, the foregoing and other objects and advantages are attained by a handle holder for installing a blade to form a portable knife, comprising:

- a blade holder configured for detachably mounting the blade to form a blade arrangement;
- a pivot unit;
- a first holder member having a first pivot end, a first opening end and a first blade recess which has a size and a shape adapted for receiving the blade holder with the blade mounted thereon;
- a second holder member having a second pivot end and a second opening end, wherein the second pivot end is pivotally connected with the first pivot end of the first holder member by the pivot unit to form a blade housing defining a blade opening at the first opening end of the first holder member and the second opening end of the second holder member, such that the second holder member covers the blade recess of the first holder member to form a blade cavity defining an opening between the first opening end of the first holder member and the second opening end of the second holder member, and that the first holder member and the second holder member are able to be rotated with each other about the pivot unit between an enclosing condition and an operable condition, wherein in the enclosing condition, the first holder member and the second holder member are overlapped with each other and adapted to be functioned as a handle of the portable knife, wherein in the operable condition, the blade holder is able to be moved towards the blade opening due to gravity for extending at least one portion of the blade out of the blade housing; and a locker device configured to selectively lock relative positions of the first holder member and the second holder member with respect to each other so as to selectively lock the handle holder in the enclosing condition and the operable condition.

In one embodiment, the locker device comprises a blade limiting arrangement provided in the blade cavity of the blade housing to limit the blade holder movably within the blade cavity.

In one embodiment, the blade limiting arrangement also limits an ultimate extending position of the blade holder.

In one embodiment, the locker device further comprises a limiter arrangement of the blade holder to limit an included angle between the first holder member and the second holder member in the operable condition.

In one embodiment, the locker device comprises a switch latch configured to be selectively switched to a locked position, an unlocked position and a detachable position, such that when the switch latch is switched to the locked position, the rotating movement of the first holder member and the second holder member about the pivot unit is locked, wherein when the switch latch is switched to the unlocked position, the first holder member and the second holder member is able to be rotated about the pivot unit between the enclosing condition and the operable condition, wherein when the switch latch is switched to the detachable position, the first holder member and the second holder member are able to be rotated with each other until the blade recess of the first holder member is accessible to outside and the blade holder is able to be removed from the blade recess for replacement of the blade.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
FIG. 1A PRIOR ART
FIG. 1A is a perspective view of a conventional foldable portable knife in unfolded condition.
Figure 1B:
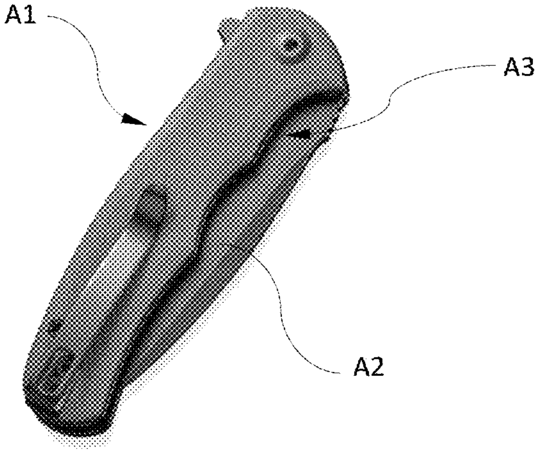
FIG. 1B PRIOR ART
FIG. 1B is a perspective view of the conventional foldable portable knife in folded condition.
Figure 2A:
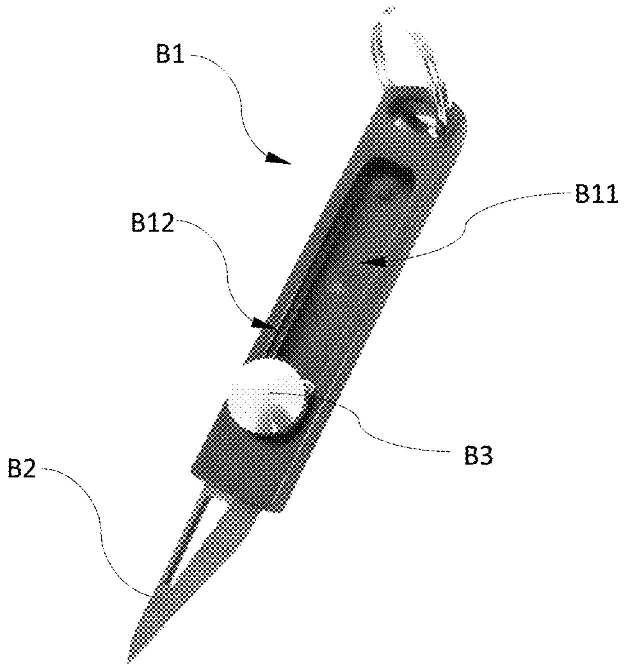
FIG. 2A PRIOR ART
FIG. 2A is a perspective view of a conventional retractable portable knife in extended condition.
Figure 2B:
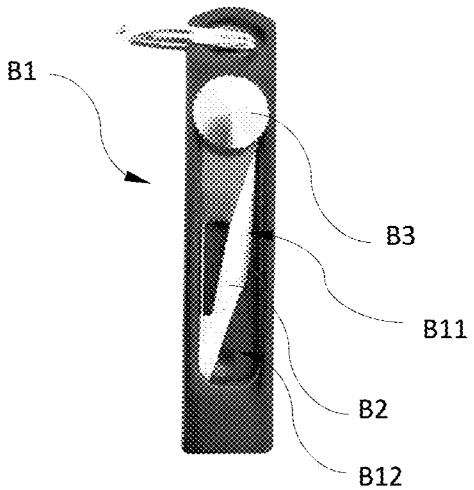
FIG. 2B PRIOR ART
FIG. 2B is a perspective view of the conventional retractable portable knife in retracted condition.
Figure 3:
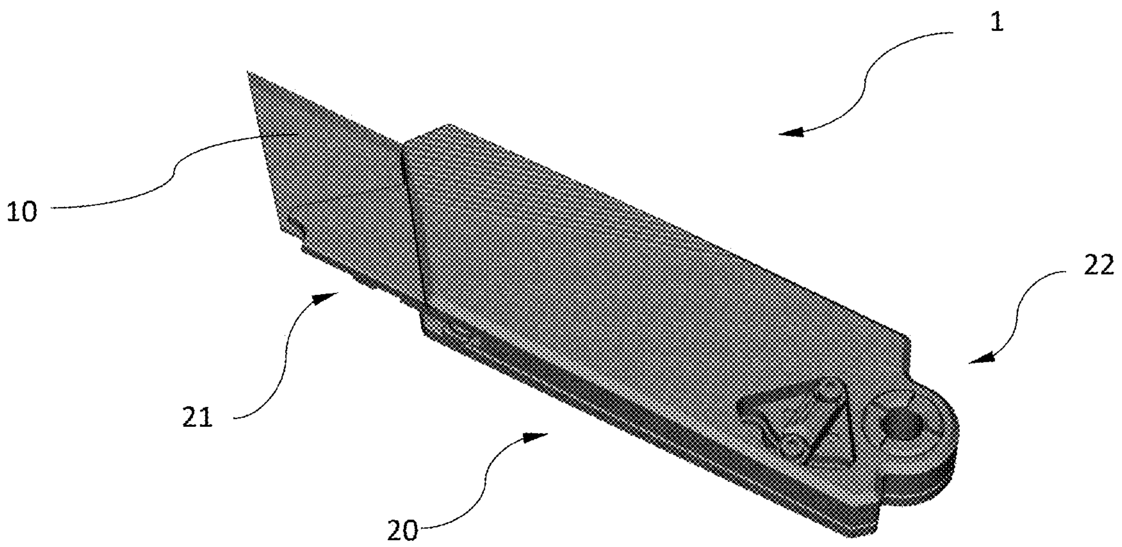
FIG. 3 is a perspective view of a handle holder installed with a blade in extended condition to form a portable blade tool according to a preferred embodiment of the present invention.
Figure 4:
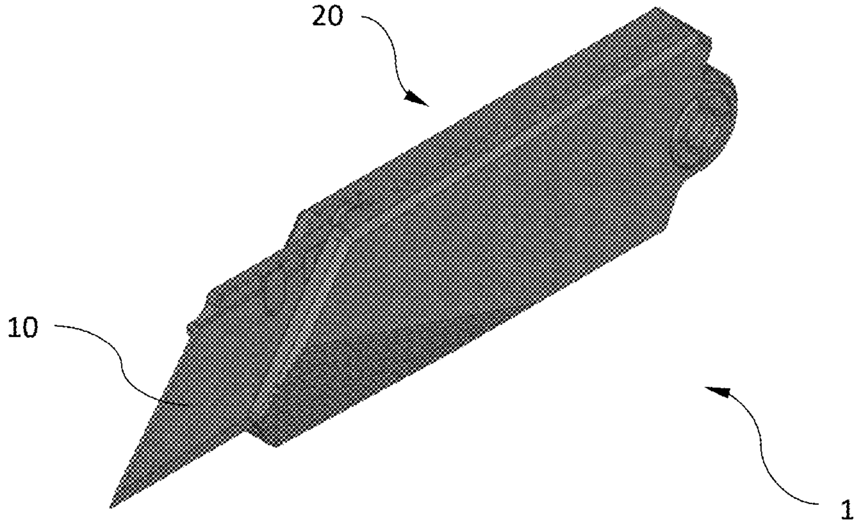
FIG. 4 is another perspective view of the handle holder according to the above preferred embodiment of the present invention.
Figure 5:
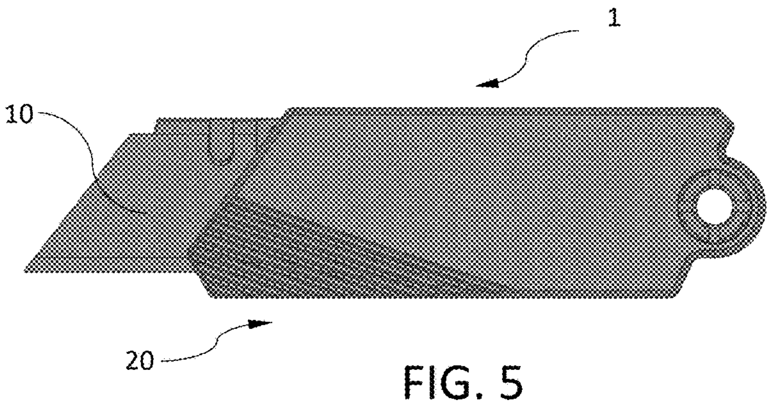
FIG. 5 is a front view of the handle holder according to the above preferred embodiment of the present invention.
Figure 7:
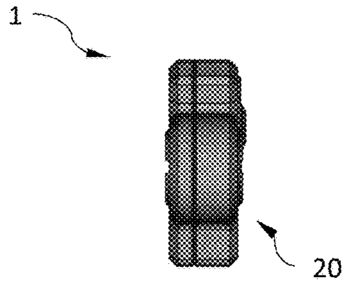
FIG. 7 is a right side view of the handle holder according to the above preferred embodiment of the present invention.
Figure 6:
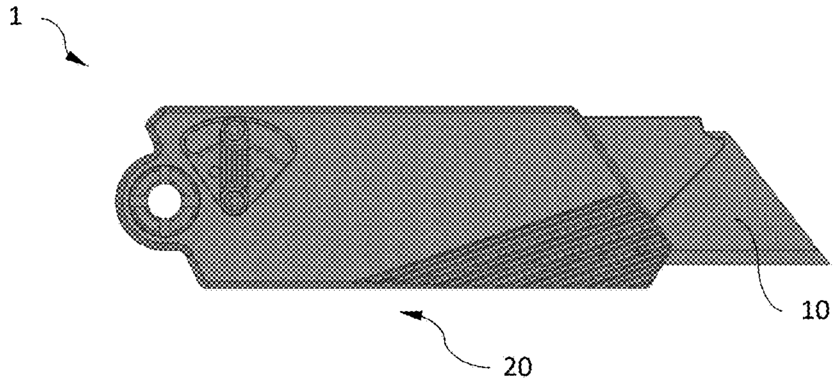
FIG. 6 is a rear view of the handle holder according to the above preferred embodiment of the present invention.
Figure 8:
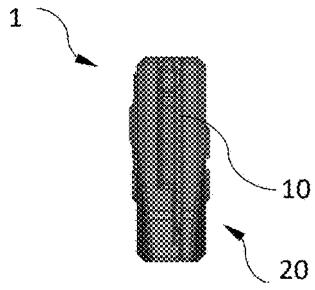
FIG. 8 is a left side view of the handle holder according to the above preferred embodiment of the present invention.
Figure 9:
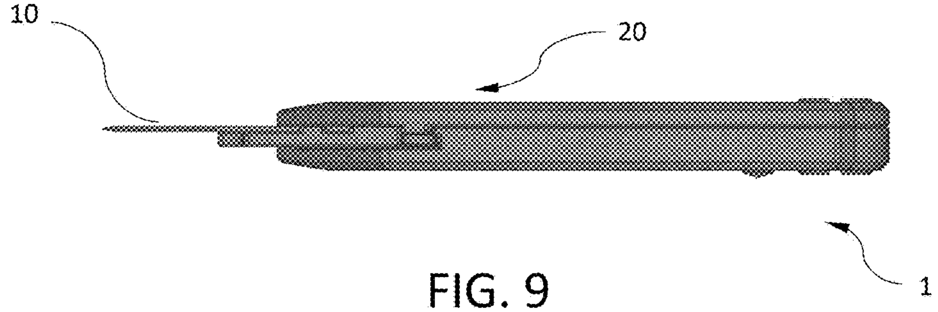
FIG. 9 is a top view of the handle holder according to the above preferred embodiment of the present invention.
Figure 10:
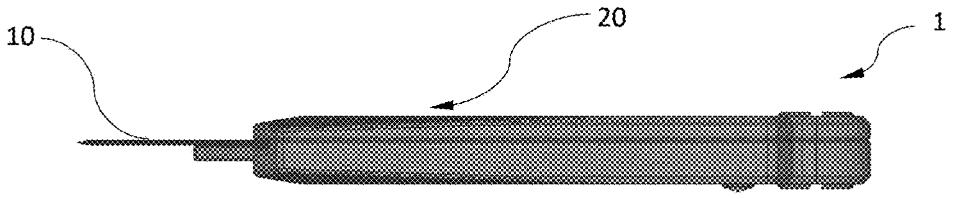
FIG. 10 is a bottom view of the handle holder according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

In the description of the present invention, unless explicitly stated otherwise and qualified, terms such as "connected," "attached," and "fixed" should be construed broadly. For instance, these terms may indicate a permanent connection or a detachable one, or they may refer to a whole unit. They can signify a mechanical linkage, an electrical connection, direct coupling, or indirect interaction through an intermediary medium. Whether these terms imply an internal connection between two elements or an interactive relationship between them will depend on the specific context and the understanding of those skilled in the art.

Throughout this invention, unless explicitly stated otherwise and qualified, when the first feature is described as being "above" or "below" the second feature, this may entail direct physical contact between the two features. Alternatively, it may signify that the first and second features are not in direct contact but are linked through the involvement of additional features. Additionally, the description of the first feature being "above," "over," or "on top of" the second feature includes scenarios where the first feature is positioned directly above or diagonally above the second feature or simply means that the first feature is situated at a higher horizontal level than the second feature. Conversely, when the first feature is referred to as "below," "under," or "beneath" the second feature, it encompasses cases where the first feature is directly below or diagonally below the second feature or simply implies that the first feature's horizontal height is less than that of the second feature.

In this embodiment's description, terms such as "up," "down," "right," and "left" are used to describe orientations or positional relationships. These descriptions are based on the orientations or positions depicted in the drawings and are employed for ease of explanation and simplification of operation. They should not be construed as indications or implications that the device or element being discussed must possess a specific orientation, be constructed in a particular manner, or operate exclusively in a certain orientation. Furthermore, terms such as "first" and "second" are employed solely for the purpose of distinction in the description and do not carry any particular significance.

Figure 14:
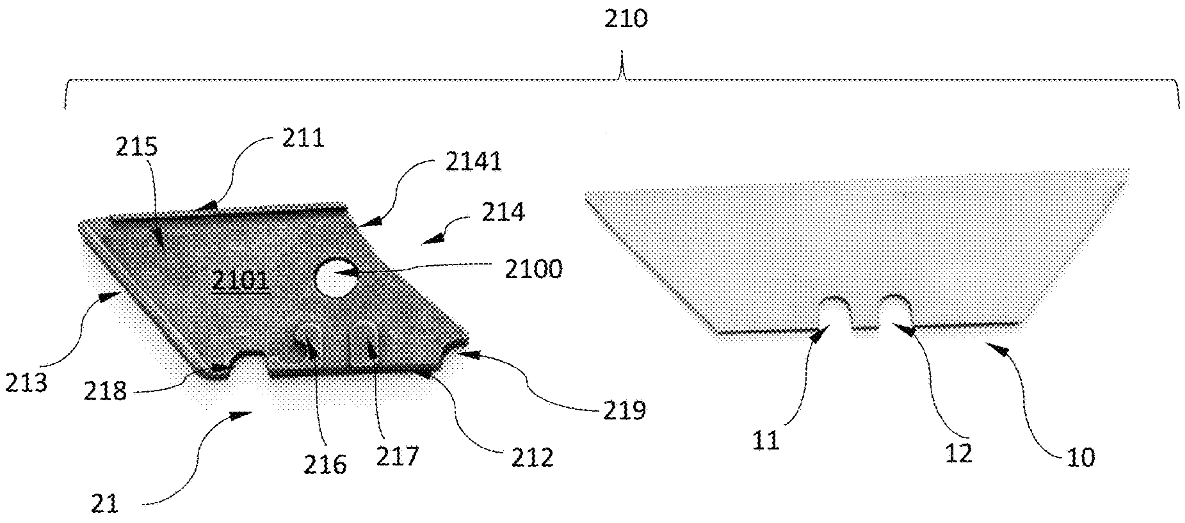
FIG. 14 is an exploded perspective view of a blade holder of the handle holder according to the above preferred embodiment of the present invention.
Figure 15A:
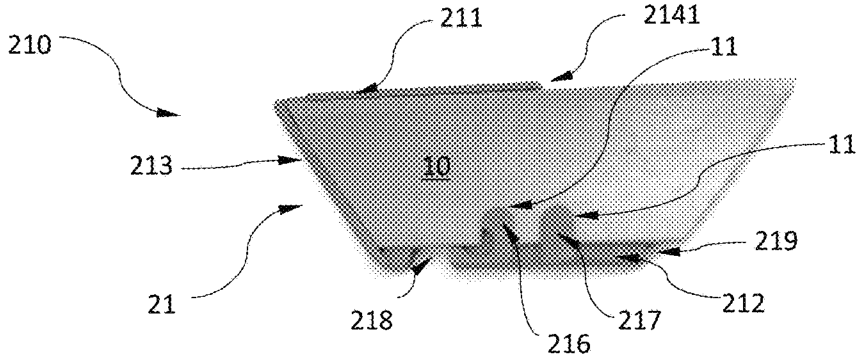
FIG. 15A is a front perspective view of the blade holder of the handle holder according to the above preferred embodiment of the present invention.
Figure 15B:
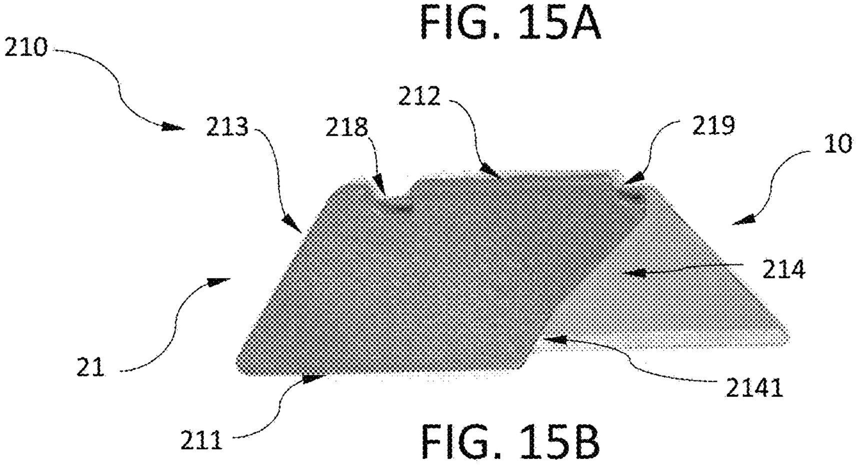
FIG. 15B is a rear perspective view of the blade holder of the handle holder according to the above preferred embodiment of the present invention.
Figure 16:
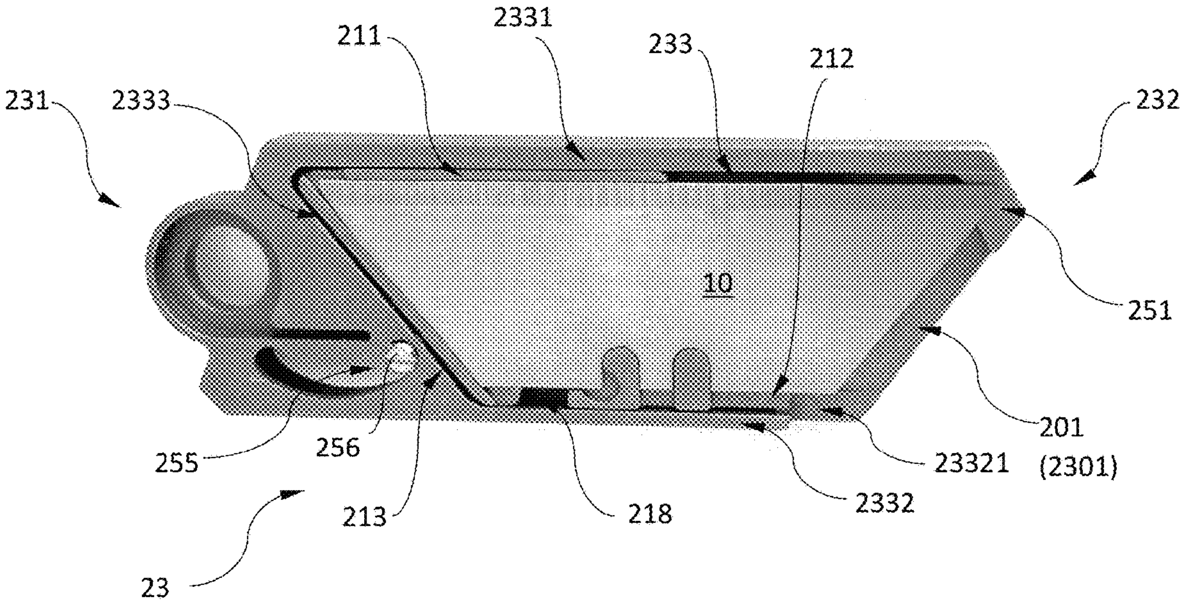
FIG. 16 is a perspective view of the blade holder received in a blade recess of the first holder member of the handle holder according to the above preferred embodiment of the present invention.
Figure 17:
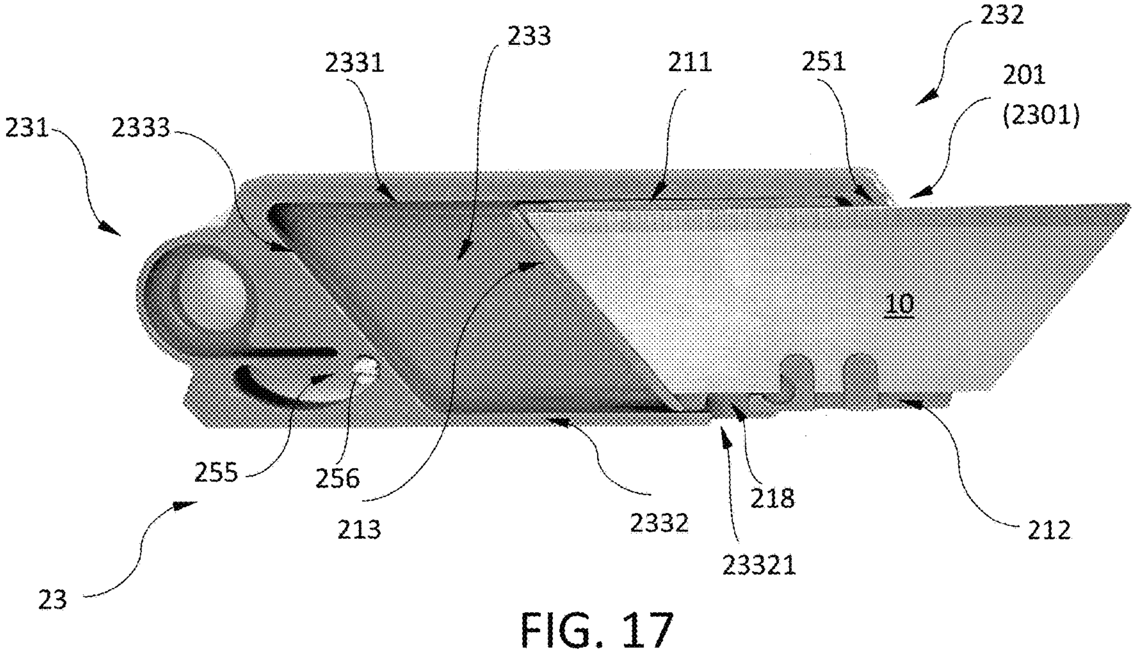
FIG. 17 is a perspective view illustrating the blade holder moved towards an opening end of the first holder member of the handle holder according to the above preferred embodiment of the present invention.
Figure 18:
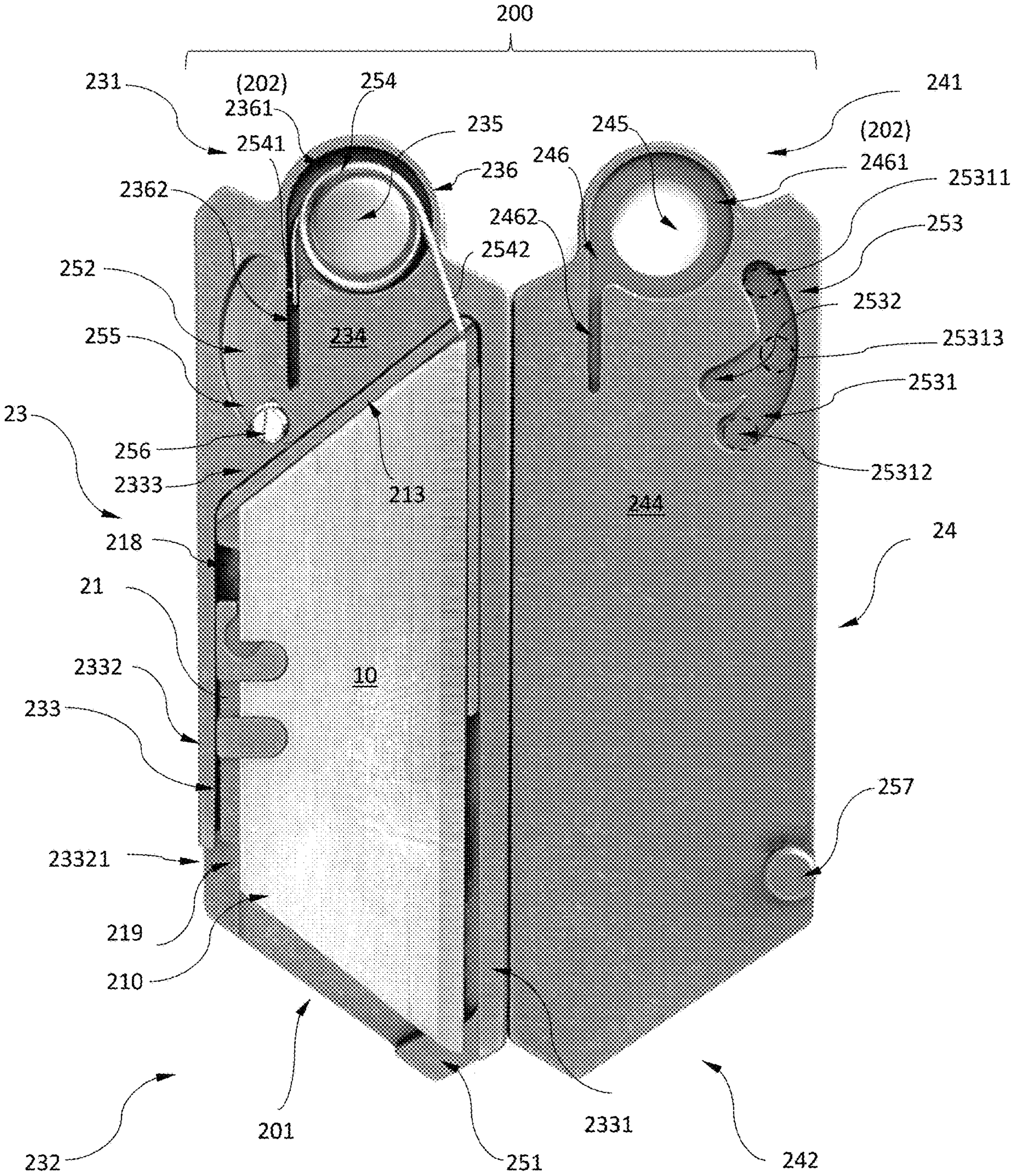
FIG. 18 is a schematic view illustrating the first holder member and the second holder member correspondingly to illustrate the locker device of the handle holder according to the above preferred embodiment of the present invention.

Referring to FIG. 3 to FIG. 10, a blade tool 1 embodied as a portable knife is illustrated while a blade 10 is extended out of a handle holder 20 according to a preferred embodiment of the present invention. According to the preferred embodiment, referring to FIG. 11, the handle holder 20 comprises a blade holder 21, a pivot unit 22, a first holder member 23, a second holder member 24, and a locker device 25. The blade holder 21 is configured for detachably mounting the blade 10 to form a blade arrangement 210 (as shown in FIG. 14 to FIG. 15B). The first holder member 23 has a first pivot end 231, a first opening end 232 and a first blade recess 233 having a size and a shape adapted for receiving the blade holder 21 with the blade 10 therein (as shown in FIG. 16 to FIG. 18).

The second holder member 24 has a second pivot end 241 and a second opening end 242, wherein the second pivot end 241 is pivotally connected with the first pivot end 231 of the first holder member 23 by the pivot unit to form a blade housing 200 defining a blade opening 201 (as shown in FIG. 11, FIG. 12, FIG. 18 and FIG. 24) at the first opening end 232 of the first holder member 23 and the second opening end 242 of the second holder member 24, such that the second holder member 24 covers the blade recess 233 of the first holder member 23 to form a blade cavity 230 having the blade opening 201 between the first opening end 232 of the first holder member 23 and the second opening end 242 of the second holder member 24.

Figure 23A:
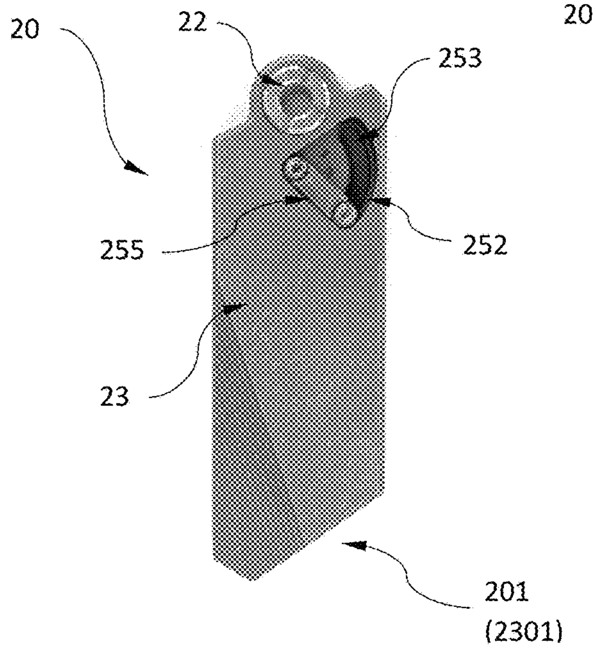
FIG. 23A to FIG. 23D are schematic views illustrating operation steps of the handle holder to extend the blade out of the handle holder of the blade tool according to the above preferred embodiment of the present invention.
Figure 23B:
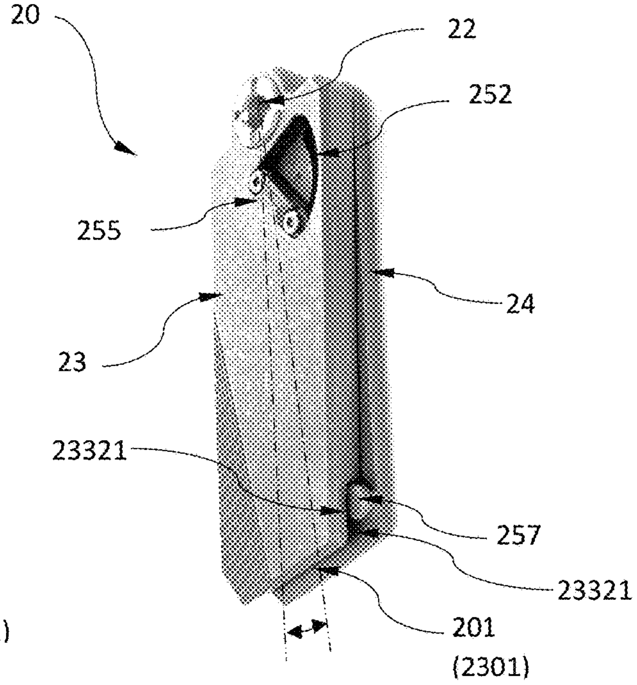
Figure 23C:
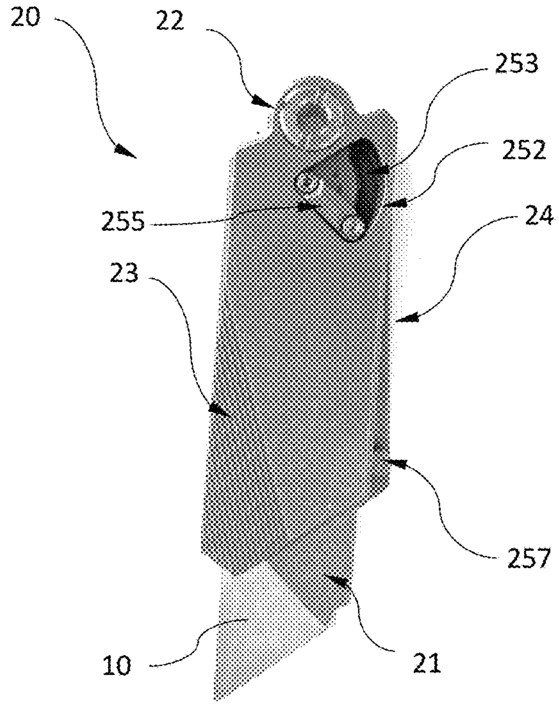

Further, referring to FIG. 23A to FIG. 23D, the first holder member 23 and the second holder member 24 are able to be rotated with each other about the pivot unit 21 between an enclosing condition (as shown in FIG. 23A) and an operable condition (as shown in FIG. 23B), wherein in the enclosing condition, the first holder member 23 and the second holder member 24 are overlapped with each other adapted to be functioned as a handle of the portable knife 1, and that in the operable condition, the blade holder 21 is able to be moved from pivot unit 22 towards the blade opening 201 due to gravity for extending at least one portion of the blade 10 out of the blade housing 200 (as shown in FIG. 23C).

The locker device 25 is configured to selectively lock relative positions of the first holder member 23 and the second holder member 24 with respect to each other so as to selectively lock the handle holder 20 in the enclosing condition and the operable condition.

It is well known that the less components the more durable and reliable of a mechanism. According to the preferred embodiment, the locker device 25 of the present invention utilizes the necessary parts of the first holder member 23 and the second holder member 24 to configure and function as a locking mechanism to guide and limit the movement of the blade holder 21, to control the locking of the blade arrangement 210 within the blade cavity 230 or the extending condition of the blade arrangement 210 with respect to the blade housing 200, to control the unlocking of the blade arrangement 210 to allow to retracting movement and extending movement thereof, and to open the blade cavity 230 to allow the removal of the blade holder 21 and the replacement of the blade 10.

Figure 12:
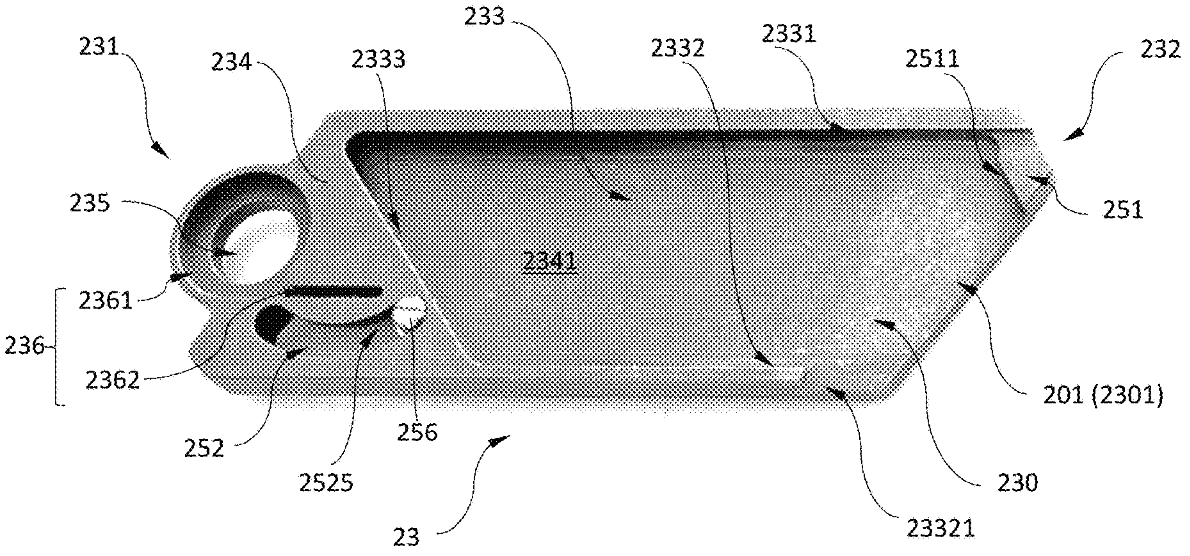
FIG. 12 is a perspective view of the first holder member of the handle holder according to the above preferred embodiment of the present invention.

In particular, referring to FIG. 12, the blade recess 233 is directly engraved in an inner side 234 of the first holder member 23 to form an indented recess defined on a bottom surface 2341. The blade recess 233 is formed between two parallel longitudinal walls 2331, 2332 and a slanted end wall 2333 to have a trapezoid shape and an opening 2301 of the blade cavity 230. It is preferred that the blade 10 also has a trapezoid shape matching with the shape of the blade recess 233 and a size slightly smaller than the size of the blade recess 233 so that the blade 10 can be fittingly received in the blade recess 233 (as shown in FIG. 18).

Further, a stopper 251 is integrally protruded from the bottom surface 2341 at one end of the opening 2301 of the blade cavity 230, wherein the stopper 251 has a triangular shape and a thickness smaller than a depth of the blade recess 233 by approximately a thickness of the blade 10. The stopper 251 has an inclined stopper surface 2511 formed facing the blade cavity 230 (the blade recess 233).

Referring to FIG. 12 and FIG. 18, a first pivot hole 235 is formed at the first pivot end 231 of the first holder member 23 and an arc shape switch slot 252 is formed between the first pivot hole 235 and the blade recess 233. A first resilient slot 236 is indented in the first pivot end 231 of the inner side 234 of the first holder member 23, which comprises a first circular slot 2361 around the first pivot hole 235 and a first elongated slot 2362 extended from the first circular slot 2361 towards the blade recess 233.

Referring to FIG. 14 to FIG. 15B, the blade holder 21 has a width between a guiding side 211 and a locking side 212, parallel to the guiding side 211, of the blade holder 21 equal to a width of the blade recess 233 of the first holder member 23 such that the blader holder 21 is able to be fittingly slide along the blade recess 233 (as shown in FIG. 16 to FIG. 17). A height of each of the parallel guiding and locking sides 211, 212 of the blade holder 21 is preferred to be equal to the height of the longitudinal walls 2331, 2332. The blade holder 21 has a slanted holder end 213 and an opposing stopping end 214, wherein the holder end 213 is configured according to the inclination of the slanted end wall 2333 of the first holder member 23, so that when the blade holder 21 is inwardly slid in the blade recess 233 until the holder end 213 is rested against the end wall 2333, the blade holder 21 with the blade 10 mounted thereon are received in the blade recess 233, i.e. the blade cavity 230 (as shown in FIG. 16 and FIG. 18), and the blade holder 21 with the blade 10 mounted on are in a retracting condition.

The stopping end 214 has a stopping surface 2141 having the same inclination as the stopper surface 2511 of the stopper 251, such that when the blade holder 21 is moving towards the opening 2301 (the cavity opening 201) to extend the blade 10 out of the blade cavity 230 (the blade recess 233), as shown in FIG. 17, the stopping surface 2141 of the blade holder 21 is blocked by the stopper surface 251 of the first holder member 23 and the blade holder 21 with the blade 10 mounted thereon are in an extending condition. Therefore, the sliding movement of the blade holder 21 is limited between the end wall 2333 and the stopping surface 2141. In other words, the control of the retracting position and the extending position of the blade holder 21 with respect to the holding housing 200 do not require any independent excess element or component but simply accomplish by the configuration of the blade recess 233 and the integral configuration of the blade holder 21.

Similarly, to securely and effectively mount the blade 10 on the blade holder 21 in a prompt manner, no additional element nor component is required. The blader holder 21 merely has a receiving groove 215 formed therein and a pair of engaging knots 216, 217 are protruded inwardly from one of the sides 212, wherein a magnet 2100 is fixed in a bottom surface 2101 of the receiving groove 215. Correspondingly, the blade 10 which is made of magnetic attractable metal, has a pair of engaging slots 11, 12 formed along one side thereof, such that the blade 10 can be promptly attached on the bottom surface 2101 due to the magnetic attraction of the magnet 2100 and fittingly mounted in the receiving groove 215 while the two engaging knots 216, 217 are engaged in the two engaging slots 11, 12, as shown in FIG. 15A, FIG. 15B and FIG. 16.

It is appreciated that the stopper 251 and the stopping surface 2141 of the stopping end 214 of the blade holder 21 configured to form a blade limiting arrangement of the locker device 25 adapted to limit the blade holder 21 movably within the blade cavity 230.

Corresponding to the first holder member 23, the second holder member 24 functions as a cover member of the holder housing 200. According to the preferred embodiment, referring to FIG. 13 and FIG. 18, the second holder member 24 has a size and shape generally matched with the first holder member 23, wherein a second pivot hole 245 is formed at the second pivot end 241 of the second holder member 24 and a second resilient slot 246 is indented in the second pivot end 241 of the inner side 244 of the second holder member 24, which comprises a second circular slot 2461 around the second pivot hole 245 and a second elongated slot 2462 extended from the second circular slot 2461 with a size and a position symmetrical with the first circular slot 2361 an the first elongated slot 2362 of the first resilient slot 236 of the first holder member 23 (as shown in FIG. 18).

Corresponding to the arc shape switch slot 2521 of the first holder member 23, a locker groove 253 is indented on the inner surface 244 of the second holder member 24, wherein the locker groove 253 has an arc shape locking groove 2531 having a curvature and a shape corresponding to the switch slot 252 of the first holder member 23 and an unlocking groove 2532, wherein the locking groove 2531 has a locking end 25311 closer to the pivot end 241 and an unlocking end 25312 curvedly extended from the locking end 25311, and that the unlocking groove 2532 is extended from a junction position 25313 located between the locking end 25311 and the unlocking end 25312 of the locking groove 2531 (preferred to be located approximately at a middle portion of the locking groove 2531) to a position adjacent to the unlocking end 25312 of the locking groove 2531.

Figure 11:
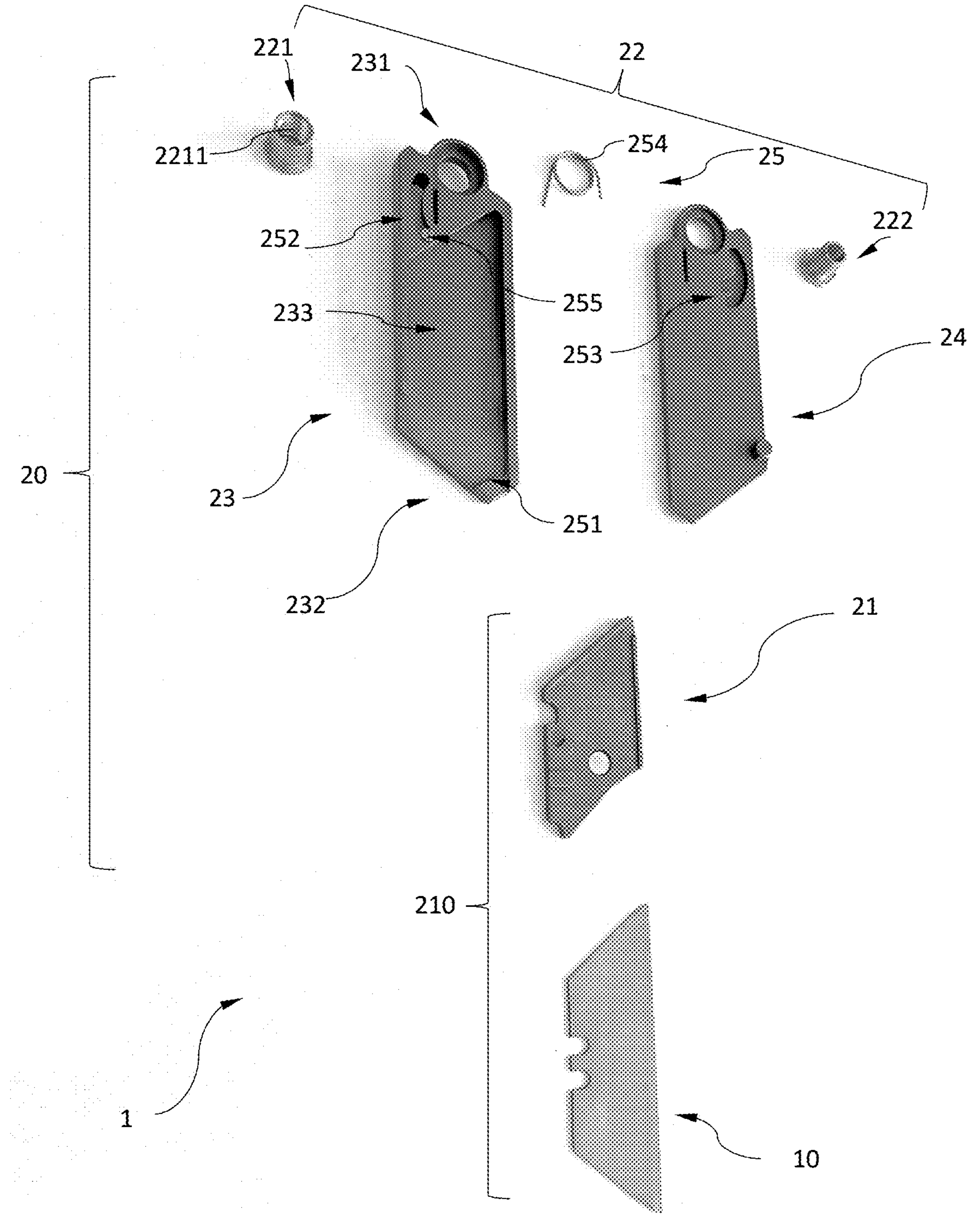
FIG. 11 is an exploded perspective view of the handle holder according to the above preferred embodiment of the present invention.

Accordingly, when the first holder member 23 and the second holder member 24 are symmetrically overlapped with each other where the inner surfaces 234 and 244 are attached face to face, the first circular slot 2361 and the second circular slot 2461 are combined to form a round cavity 202, as shown in FIG. 18, while the first elongated slot 2362 and the second elongated slot 2462 are opposingly and parallelly extended from the round cavity 202. The locker device 25 comprises a resilient element 254, as shown in FIG. 11 and FIG. 18, which is embodied as a spiral spring having two elongated ends 2541, 2542 with an included angle larger than 90 degrees therebetween, wherein the resilient element 254 is configured to be received in the round cavity 202 formed by the first circular slot 2361 and the second circular slot 2362 while the two elongated ends 2541, 2542 are extended into the first elongated slot 2362 and the second elongated slot 2462 respectively.

It is appreciated that the locker device 25 is configured by integral portions of the blade holder 21, the first holder member 23 and the second holder member 24 to equip with each other without any additional or extra component to be incorporated that not only minimize the production cost of the handle holder 1 but also ensure a durable and reliable mechanical linkage and movement operation.

Figure 19A:
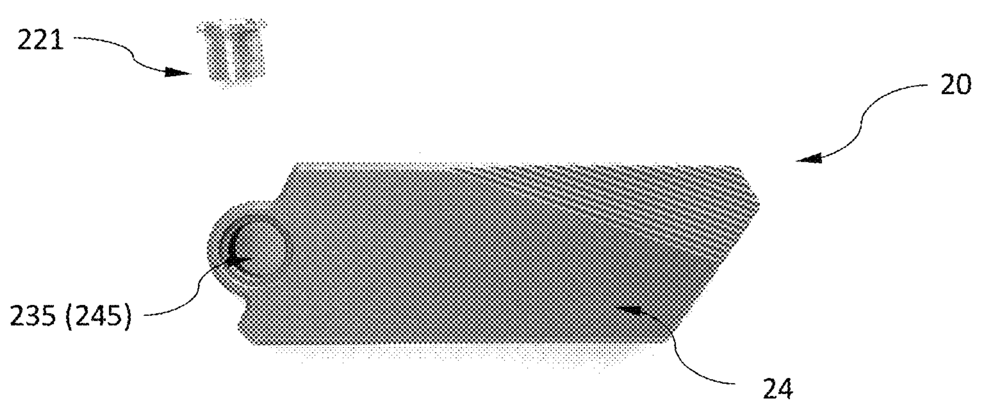
FIG. 19A to FIG. 19C are schematic views illustrating the steps of assembling the handle holder according to the above preferred embodiment of the present invention.
Figure 19B:
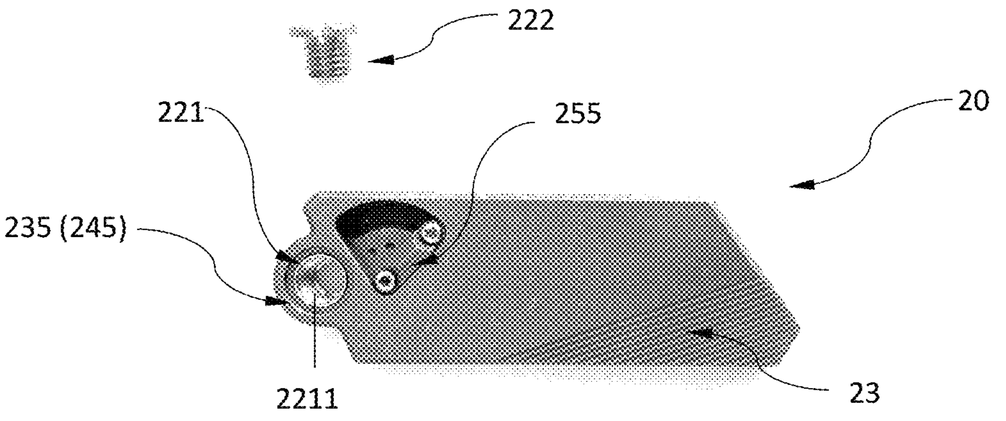
Figure 19C:
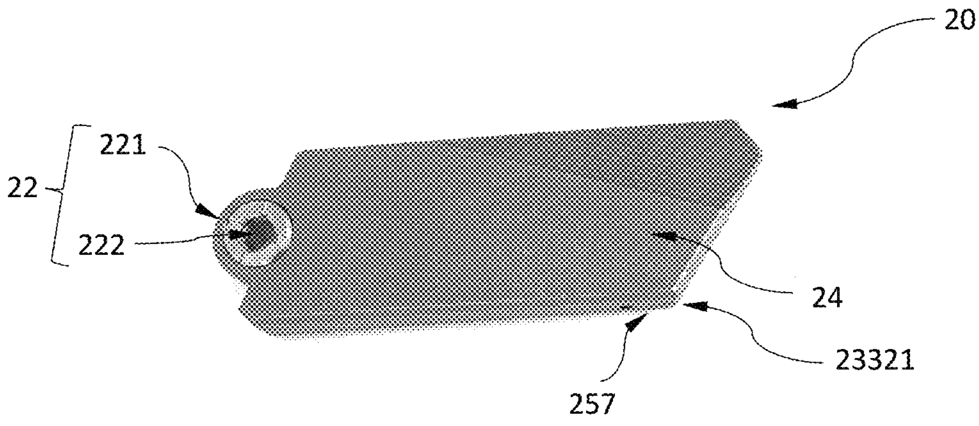
Figure 20A:
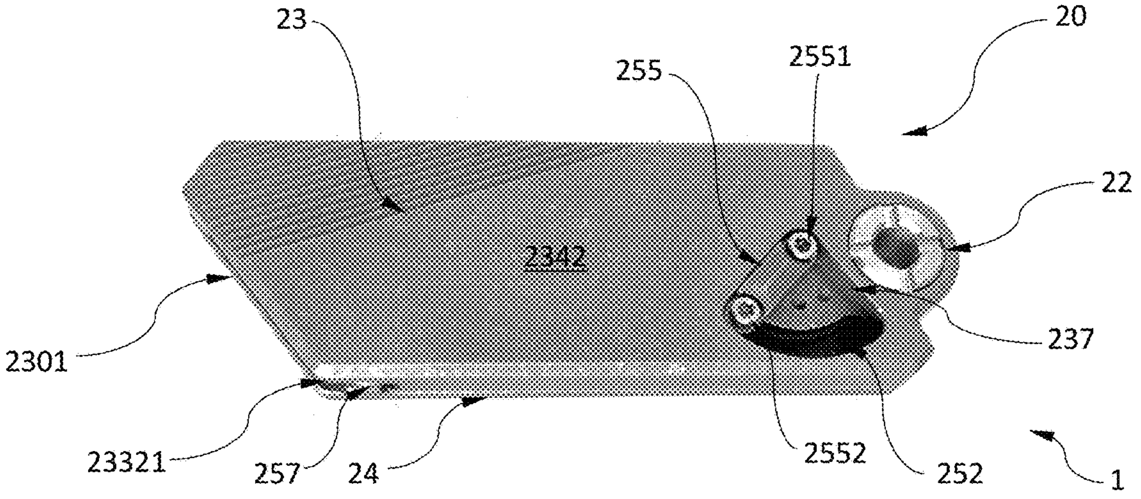
FIG. 20A to FIG. 20C are schematic views illustrating the operation of a switch latch of the locker device of the handle holder according to the above preferred embodiment of the present invention.
Figure 20B:
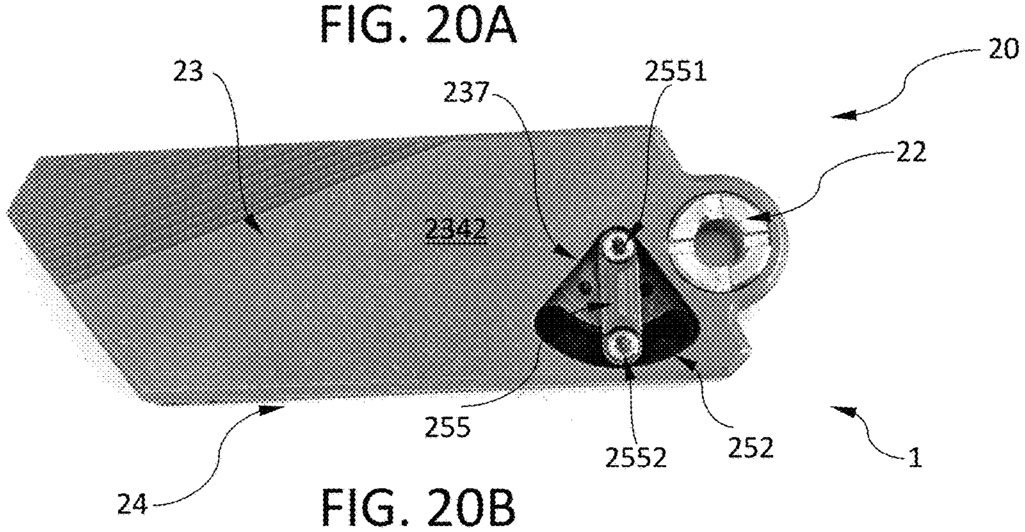
Figure 20C:
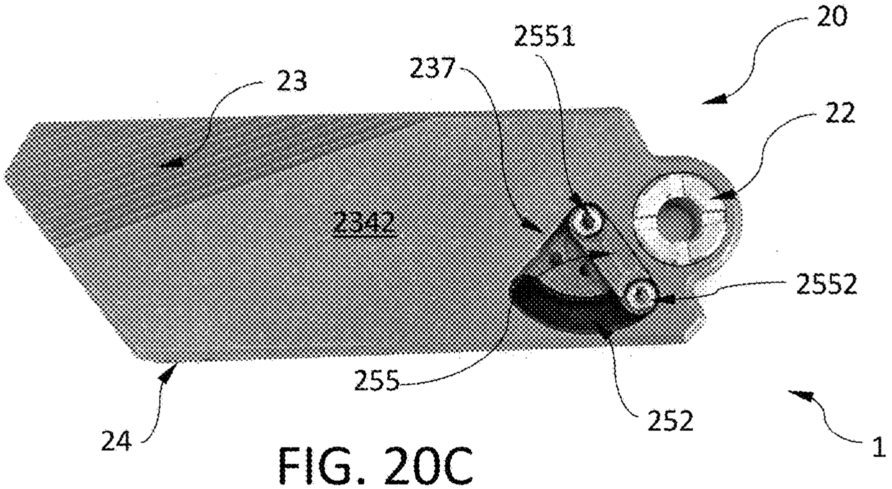

Incorporating with the switch slot 252 and the locker groove 253, referring to FIG. 18 to FIG. 21, the locker device 25 comprises a switch latch 255 having a connecting end 2551 pivotally connected to the first holder member 23 and a switching end 2552 perpendicularly connected with a switch button 256 extended through the switch slot 252 and inserted into the locker groove 253, such that by rotating the switch latch 255 about its connecting end 2551, the switch button 256 is able to be switched between the unlocking end 23512 (as shown in FIG. 20A) and the locking end 23511 (as shown in FIG. 20C). In other words, the switch latch 255 is capable of switching away from the pivot unit 22 to an unlocked position as shown in FIG. 20A, switching to a middle detachable position as shown in FIG. 20B and switching towards the pivot unit 22 to a locked position as shown in FIG. 20C, In order to better guide and limit the switching movement of the switch latch 255, a triangular guider groove 237 is indented in an outer surface 2342 of the first holder member 23 at a position corresponding to the switch slot 252, such that the switching of the switch latch 255 is guided and limited within the guider groove 237.

Referring to FIG. 11 and FIG. 19A to FIG. 19C, the assembling of the first holder member 23 and the second holder member is accomplished by the pivot unit 22, which comprises a tubular pivot shaft 221 and a secure element 222. As shown in FIG. 19A, the pivot shaft, having a threaded through hole 2211, is configured to insert through the first pivot hole 235 and the second pivot hole 245 as shown in FIG. 19B, and then the secure element 222, embodied as a hollow screw, is screwed into the threaded through hole 2211 from another end to tightly fasten with the pivot shaft 221 as shown in FIG. 19C, so that the pivot unit 22 pivotally connects the first holder member 23 an the second holder member 24 at their pivot ends 231, 241, allowing the first holder member 23 and the second holder member 24 to rotate with each other about the pivot unit 22. Furthermore, the incorporation of the switch latch 255 with its switch button 256 with respect to the switch slot 252 and the locker groove 253 configures the locker device 25 to control the operation of the first and second holder members 23, 24 of the holder housing 200 with respect to the retracting position and extending position of the blade holder 21 within the blade cavity 230. In other words, the configuration of switch latch 255, the switch slot 252 and the locker groove 253 configures a limiter arrangement to limit an included angle between the first holder member 23 and the second holder member 24 in the operable condition.

Figure 22A:
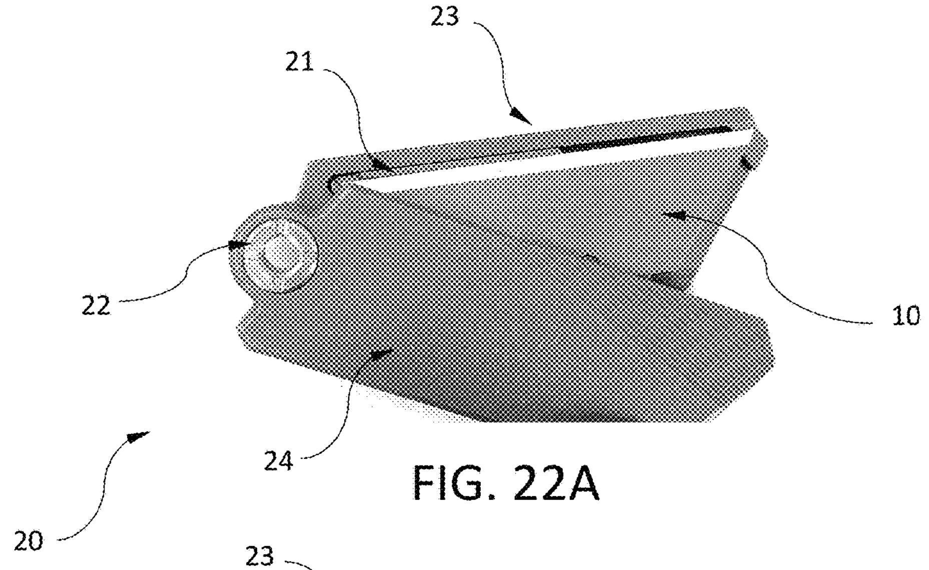
FIG. 22A to FIG. 22C are schematic views illustrating steps of detaching the blade holder from the handle holder according to the above preferred embodiment of the present invention.
Figure 22B:
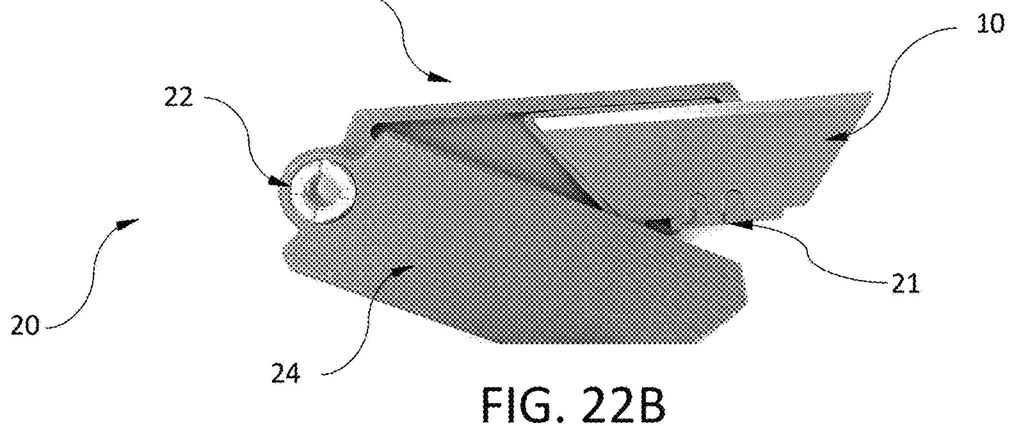
Figure 22C:
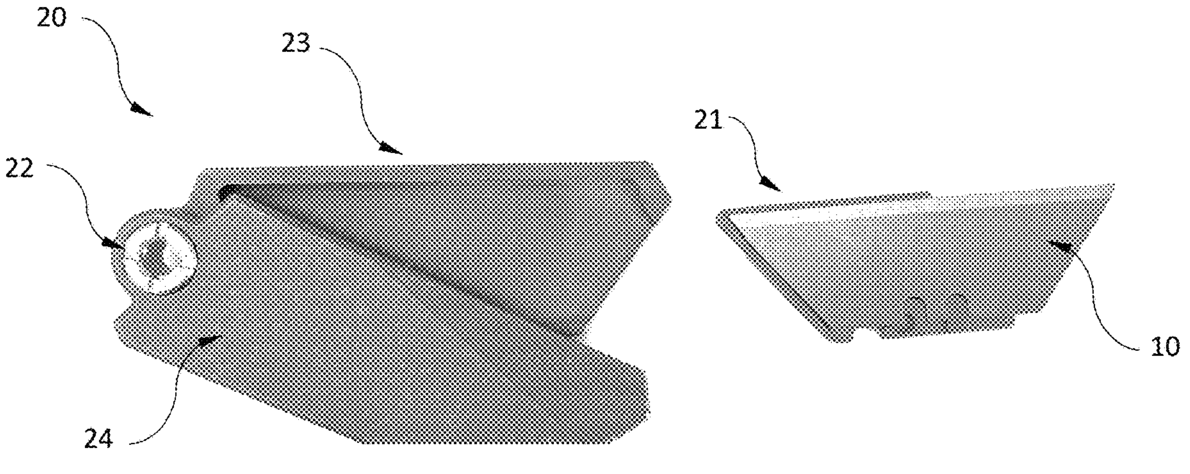

Specifically, the switch latch 255 of the locker device 25 is configured to be selectively switched to the locked position, the unlocked position and the detachable position, such that when the switch latch 255 is switched to the locked position, the rotating movement of the first holder member 23 and the second holder member 24 about the pivot unit 22 is locked, wherein when the switch latch 255 is switched to the unlocked position, the first holder member 23 and the second holder member 24 is able to be rotated about the pivot unit 22 between the enclosing condition and the operable condition, wherein when the switch latch 255 is switched to the detachable position, the first holder member 23 and the second holder member 24 are able to be rotated with each other until the blade recess 233 of the first holder member 23 is accessible to outside and the blade holder is able to be removed from the blade recess 23 for replacement of the blade 10, as shown in FIG. 22A to FIG. 22C.

Figure 13:
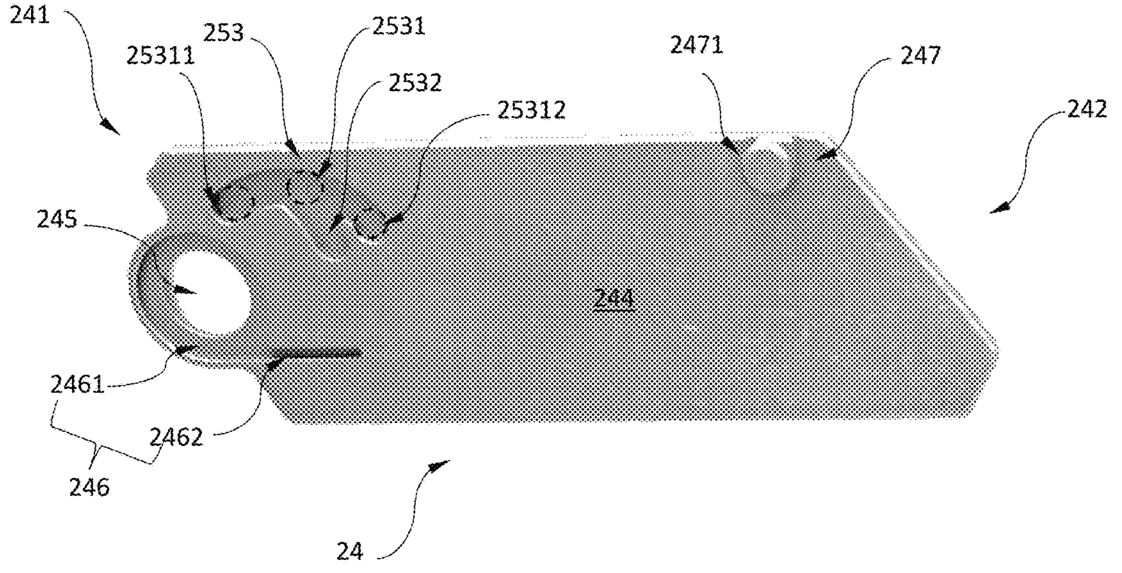
FIG. 13 is a perspective view of the second holder member of the handle holder according to the above preferred embodiment of the present invention.
Figure 23D:
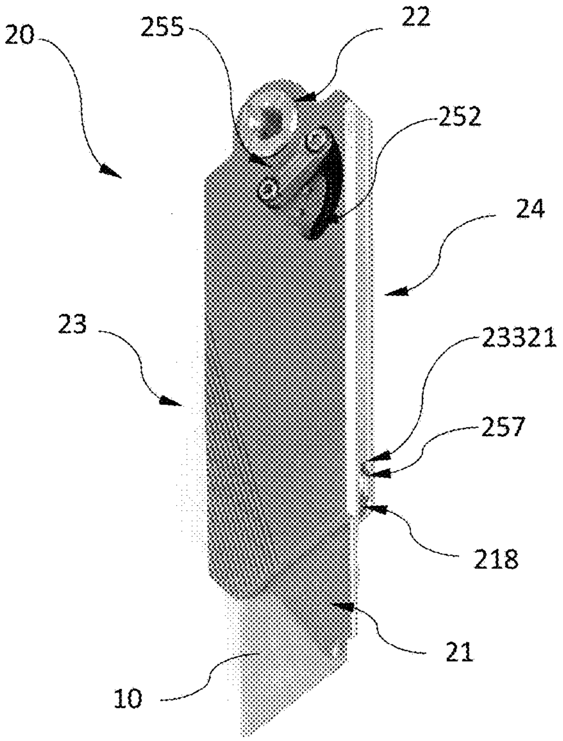

Referring to FIG. 12, FIG. 13 and FIG. 18, the locker device 25 further comprises a locking button 257 protruded on the inner surface 244 of the second holder member 24 at a position close to an opposing end of the opening 2301 of the blade cavity 230 opposing the stopper 251 protruded on the inner surface 234 of the first holder member 23. Correspondingly, a locking slot 218 is indented at an inner end of the locking side 212 of the blade holder 21 where the engaging knots 216, 217 are provided and a locking recess 219 is formed at an outer end of the locking side 212 of the blade holder 21, as shown in FIG. 14 to FIG. 15B, such that when the blade holder 21 is retracted to the retracting condition, as shown in FIG. 18 and FIG. 20A, the locking button 257 is engaged in the locking recess 219 so as to block and lock the blade holder 21 and the blade 10 mounted thereon to be retained within the blade cavity 230. Also, when the blade holder 21 is extended to the extending condition, as shown in FIG. 17 and FIG. 23D, by means of the blocking of the stopper 251 provided on the first holder member 23 with the stopping surface 2141 of the blade holder 21 and the engaging of the locking button 257 of the locker device 25 with the locking slot 218, the blade holder 21 and the blade 10 mounted thereon are locked in the extending condition with the blade 10 extending out of the blade cavity 230.

It is worth mentioning that, corresponding to the protruded locking button 257 of the second holder member 24, a front end of the corresponding longitudinal wall 2332 forms a button recess 23321 (as shown in FIG. 12) to receive the locking button 257 when the first holder member 23 and the second holder member 24 are overlapped with each other as shown in FIGS. 19C, 20A, 23B, and 23D.

The operation of first holder member 23 and the second holder member 24 in the enclosing condition and the operable condition through selectively switching the switch latch 255 in the locking position, the unlocked position and the detachable position is described below to illustrate the structural concept of a gravity-telescopic configuration for retracting the blade 10 to be concealed in the blade cavity 230 of the handle holder 20 and extending the blade 10 out of the blade cavity 230 for use due to gravity.

When the switch latch 255 is switched to the locked position (as shown in FIG. 20C) by rotating the switch latch 255 towards the pivot unit 22 about the connecting end 2551 thereof within the guider groove 237, the switch latch 255 blocks the rotation between the first holder member 23 and the second holder member 24 about the pivot unit 22, wherein the connecting end 2551 of the switch latch 255 is connected to the first holder member 23 while the switching end 2552 of the switch latch 255 is extended into the locking end 25311 of the locking groove 2531 of the second holder member 24 through the switch slot 252. Since the switching end 2552 of switch latch 255 is located close to the pivot unit 22 in this locked position in such a manner that the switch latch 255 blocks the swinging or rotating movement between the first holder member 23 and the second holder member 24 with respect to each other.

Accordingly, when the blade holder 21 is positioned in the retracting position (as shown in FIG. 18), the locking button 257 provided on the first holder member 23 is engaged in the locking recess 219 of the blade holder 21 to block and lock the sliding movement of the blade holder 21 in the blade recess 233 (the blade cavity 230) towards the opening 2301 of the blade cavity 230, such that the handle holder 20 is in the enclosing condition and the blade holder 21 and the blade 10 mounted thereon are completely enclosed in the blade cavity 230 (as shown in FIG. 18 and FIG. 20C) and will not move out of the blade opening 201 (the opening 2301 of the handle holder 20) without releasing the locked position of the switch latch 255.

In addition, when the blade holder 21 is positioned in the extending condition (as shown in FIG. 17 and FIG. 23D), the stopping surface 2141 of the blade holder 21 biases against stopper surface 2511 of the stopper 251, the sliding movement of the blade holder 21 in the blade recess 233 (the blade cavity 230) is blocked and locked to further slide out of the opening 2301 of the blade cavity 230 and, at the same time, the locking button 257 provided on the first holder member 23 is engaged in the locking slot 218 of the blade holder 21 to block and lock the blade holder 21 with the blade 10 thereon to retract back into the blade recess 233 (the blade cavity 230), so as to securely lock the blade holder 21 and the blade 10 mounted thereon in the extending position for use, wherein during such extending position of the blade holder 21, the blade 10 is extended out and the blade holder 21 is unable to move forwards nor backwards without releasing the locked position of the switch latch 255.

Figure 24A:
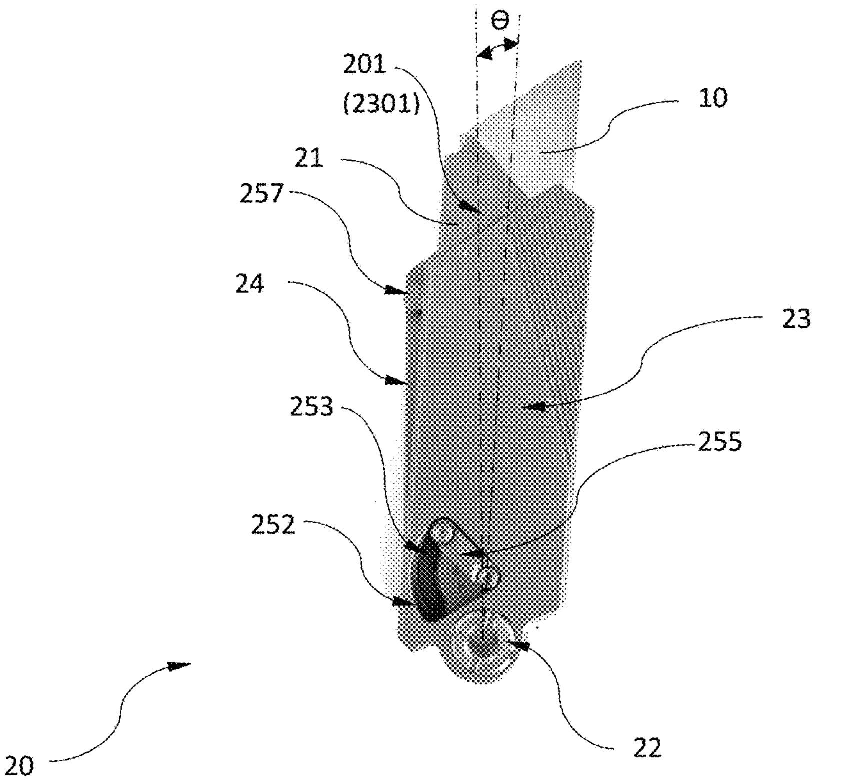
FIG. 24A to FIG. 24C are schematic views illustrating operation steps of the handle holder to retract the blade in the handle holder of the blade tool according to the above preferred embodiment of the present invention.

In order to extend the blade holder 21 out from its enclosing condition, or to retract the blade holder 21 from its extending condition back to enclosing condition, the switch latch 255 must be released from the locked position, that is rotating the switching end 2552 of the switch latch 255 about its connecting end 2551 to the unlocking end 25312 of the locking groove 2531 (as shown in FIG. 18) so as to switch the switch latch 255 to the unlocking position (as shown in FIG. 20A and FIG. 24A).

While the switch latch 255 is in the unlocking position, the blocking of the rotating movement of the first holder member 23 and the second holder member 24 with respect to each other is released, referring to FIG. 23A to FIG. 23D, the first holder member 23 and the second holder member 24 are allowed to rotate with respect to each other for a predetermined included angle θ about the pivot unit 22 (as shown in FIG. 18 and FIG. 23B), such that the locking button 257 provided on the first holder member 23 is driven by the rotating first holder member 23 to disengage with the locking recess 219 of the blade holder 21 and the blade holder 21 is able to be converted from the retracting condition (as shown in FIG. 23A) to the extending condition (as shown in FIG. 23C and FIG. 23D).

By means of the locking arrangement of the locking button 257 of the locker device 25 with respect to the locking slot 218 and the locking recess 219 of the blade holder 21 of the locker device 25 and the limiter arrangement of the switch latch 255 of locker device 25 with respect to the switch slot 252 of the first holder member 23 and the locker groove 253 provided in second holder member 24, the conversion of the blade holder 21 between the retracting condition and the extending condition is able to be operated through the gravity automatically.

Referring to FIG. 23A, to operate the blade holder 21 from the retracting condition to the extending condition, firstly switch the switch latch 255 to the unlocking position and point the opening 2301 (the blade opening 201) downwards. Then, referring to FIG. 23B, rotate the first holder member 23 and the second holder member 24 with respect to each other about the pivot unit 22 for an included angle θ to release the engagement of the locking button 257 from the locking recess 219, the blade holder 21 and the blade 10 mounted thereon drop down due to gravity until the stopper surface 2141 of the stopping end 214 of the blade holder 21 is stopped by the stopper surface 2511 of the stopper 251 protruded on the first holder member 23, so that at least a cutting portion of the blade 10 is extended out of the blade cavity 230 (as shown in FIG. 23C) and the blade holder 21 is in the extending condition. At this time, the locking button 257 is aligned with the locking slot 218 of the blade holder 21 and simply by rotating back the first holder member 23 and the second holder member 24 with respect to each other in a reverse direction back to their original position, as shown in FIG. 23D, the locking button 257 is engaged with the locking slot 218 and lock the extending condition of the blade holder 21 in position. Finally, to further secure the extending condition of the blade holder 21 to prevent retracting back accidentally, the switch latch 255 is preferred to switch from the unlocking position to the locking position as shown in FIG. 23D.

Figure 24B:
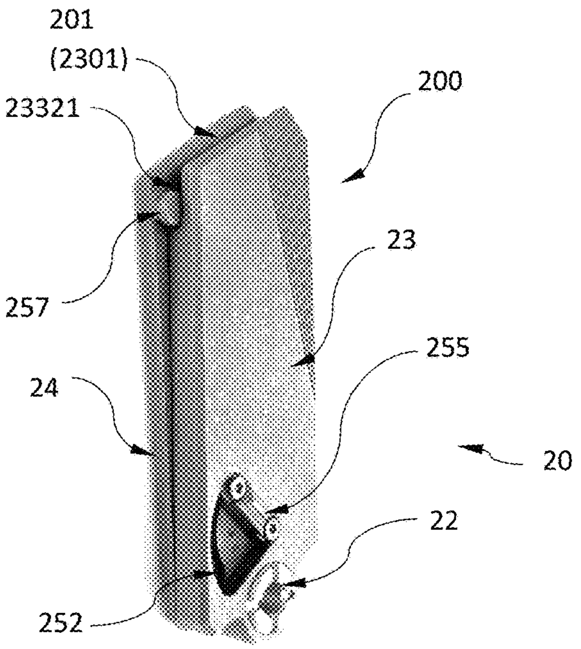
Figure 24C:
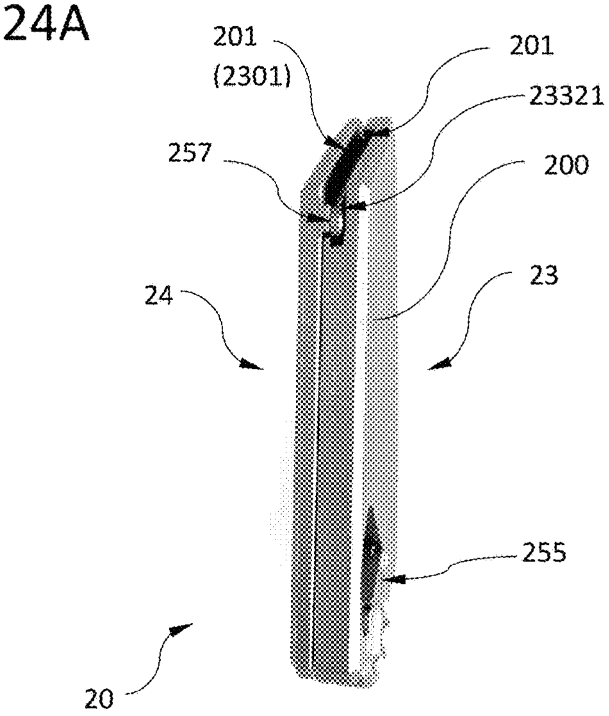

Referring to FIG. 24A, to operate the blade holder 21 from the extending condition to the retracting condition, firstly switch the switch latch 255 to the unlocking position and point the opening 2301 (the blade opening 201) upwards, and then rotate the first holder member 23 and the second holder member 24 with respect to each other about the pivot unit 22 for an included angle θ to release the engagement of the locking button 257 from the locking recess 219, the blade holder 21 and the blade 10 mounted thereon drop down into the blade cavity 230 (the blade recess 233) due to gravity until the holder end 213 of the blade holder 21 is stopped by the end wall 2333 of the first holder member 23, so that the blade 10 and the blade holder 21 are retracted in the blade cavity 230 (as shown in FIG. 24B), that is the blade holder 21 is in the retracting condition. At this time, the locking button 257 is aligned with the locking recess 219 of the blade holder 21 and simply by rotating back the first holder member 23 and the second holder member 24 with respect to each other in a reverse direction back to their original position, as shown in FIG. 24C, the locking button 257 is engaged with the locking recess 219 and lock the retracting condition of the blade holder 21 in position. Finally, to further secure the retracting condition of the blade holder 21 to prevent the blade 10 from extending out of the opening 2301 of the blade cavity 230, the switch latch 255 is preferred to switch from the unlocking position to the locking position as shown in FIG. 24C.

It is appreciated that the resilient element 254 is mounted in the round cavity 202 (that is the combined first circular slot 2361 and the second circular slot 2362) while the first and second elongated ends 2541, 2542 of the resilient element 254 are respectively engaged in the first and second elongated slots 2361, 2362, the first holder member 23 and the second holder member 24 are retained in overlapping with each other in the enclosing condition as the holder housing 200 unless an external rotating force is applied to the first holder member 23 and the second holder member 24 to rotate for the included angle θ to the operable condition that the engagement of the locking button 257 with respect to the locking slot 218 or the locking recess 219 is released and the blade holder 21 is free to slide along the blade cavity 230 between the extending condition and the retracting condition. Once the external rotating force is released, the first holder member 23 and the second holder member 24 are rotated back to the enclosing condition due to the resilient force of the resilient element 254 applied to the first holder member 23 and the second holder member 24.

Figure 21:
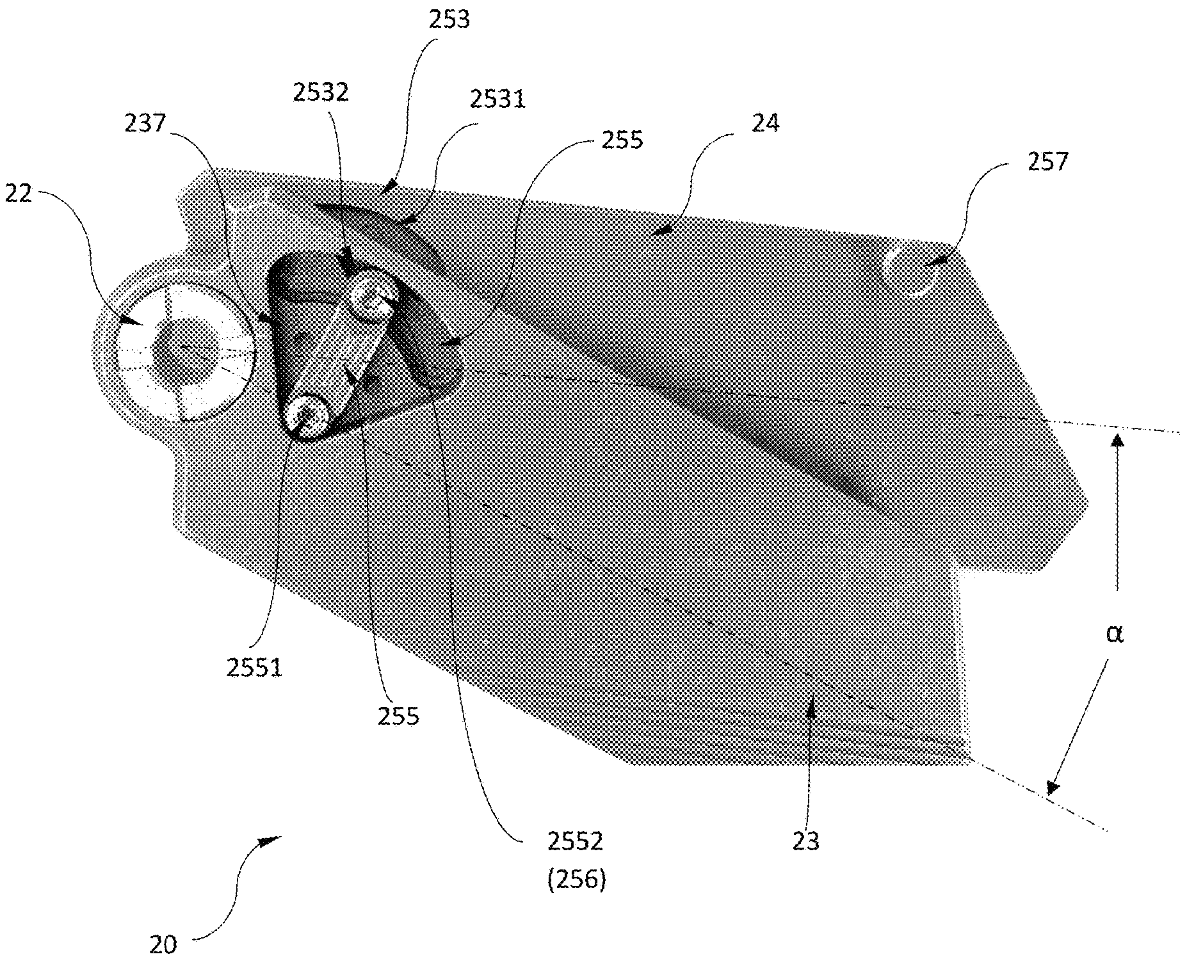
FIG. 21 is a perspective view illustrating the first holder member and the second holder member of the handle holder are switched to open condition while the switch latch is in a detachable position according to the above preferred embodiment of the present invention.

Between the unlocking position as shown in FIG. 20A and the locking position as shown in FIG. 20C, the switch latch 255 is able to be switch a detachable position as shown in FIG. 20B, wherein the switch button 256 of the switch latch 255 is positioned at a junction position 25313, as shown in FIG. 18 and FIG. 21, between the locking groove 2531 and the unlocking groove 2532, such that the first holder member 23 and the second holder member 24 are able to be further rotate with respect to each other by an external rotating force to have an including angle α therebetween larger than the included angle θ until the switch button 256 is located at an end of the unlocking groove 2532 and the first holder member 23 and the second holder member 24 are in the detachable condition (as shown in FIG. 21 and FIG. 22A), wherein the first holder member 23 and the second holder member 24 of the handle holder 20 is in a detaching condition.

Referring to FIG. 22A to FIG. 22C, in the detaching condition, the first holder member 23 and the second holder member 24 are rotated to open up to have a distance therebetween equal to or slightly largen than a width of the blade holder 21 and the blade mounted thereon (as shown in FIG. 22A and FIG. 22B) that the blade recess 233 of the first holder member 23 is accessible to outside, so that the blade holder 21 can be detached from the blade cavity 230 with the blade 10, as shown in FIG. 22C, for replacing the blade 10. After a new blade 10 is placed on the blade holder 21, the blade holder 21 with the new blade 10 mounted thereon can be slid back into the blade cavity 230 and the first holder member 23 and the second holder member 24 are able to be rotated about the pivot unit 22 back to its enclosing condition (as shown in FIG. 20B) due to the resilient element 254 when the external rotating force applied to the first and second holder members 23, 24 is released. Then, by switching the switch latch 255 to the locking position as shown in FIG. 20C, the handle holder 20 is operated to its ready to use condition.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A blade tool, comprising:

a blade; and a handle holder, comprising:

a blade holder configured to detachably mount said blade;

a pivot unit;

a first holder member having a first pivot end, a first opening end and a blade recess having a size and a shape configured to receive said blade holder with said blade mounted thereon;

a second holder member having a second pivot end and a second opening end, wherein said second pivot end is pivotally connected with said first pivot end of said first holder member by said pivot unit to form a blade housing and define a blade opening at said first opening end of said first holder member and said second opening end of said second holder member, such that when said first holder member and said second holder member are overlapped with inner surfaces thereof facing each other, said second holder member covers said blade recess of said first holder member to form a blade cavity and said first opening end of said first holder member and said second opening end of said second holder member cooperatively defines said blade opening communicating with said blade cavity, and that said first holder member and said second holder member are rotatable relative to each other about said pivot unit between an enclosing condition and an operable condition, wherein in the enclosing condition, said first holder member and said second holder member are overlapped and said blade holder is able to be retained within said blade cavity, wherein in the operable condition, said first holder member and said second holder member are able to be rotated about said pivot unit for a predetermined included angle, such that said blade holder is able to slide within said blade cavity and move towards said blade opening of said blade cavity due to gravity to extend at least one portion of said blade out of said blade housing; and a locker device, coupled with at least one of said first holder member and said second holder member, comprising a movable locking element configured to:

selectively limit said blade holder movably within said blade cavity in at least one of a retracted position and an extended position, wherein in the retracted position, said blade is received within said blade cavity, and in the extended position, said at least one portion of said blade is extended outwards through said blade opening, and selectively lock relative positions of said first holder member and said second holder member with respect to each other so as to selectively lock said handle holder in the enclosing condition and selectively permit rotation to the operable condition.

2. The blade tool, as recited in claim 1, wherein said locker device comprises a blade limiting arrangement provided in said blade cavity of said blade housing to limit said blade holder movably within said blade cavity, wherein said blade limiting arrangement incudes at least one stopping surface which is associated with at least one of the handle holder and said blade holder and arranged to limit a sliding movement of said blade holder within said blade cavity so as to define at least one of the retracted position and the extended position of said blade holder.

3. The blade tool, as recited in claim 2, wherein said locker device further comprises a limiter arrangement configured to limit the predetermined included angle between said first holder member and said second holder member in the operable condition, wherein said limiter arrangement includes a slot formed in one of said first holder member and said second holder member that movably supports a switch latch and a limiting element formed on the other of said first holder member and said second holder member, wherein said limiting element is movably received within said slot during a rotation between said first holder member and said second holder member about said pivot unit, wherein engagement between said limiting element and at least one portion of said slot limits further rotation between said first holder member and said second holder member about said pivot unit.

4. The blade tool, as recited in claim 3, wherein said locker device comprises a switch latch supported by said first holder member, wherein said switch latch is movably mounted on said first holder member and guided by a switch slot formed in said first holder member, wherein said switch latch is movably relative to said first holder member between a locked position, an unlocked position and a detachable position, wherein in the locked position, a portion of said switch latch is engaged with a locker groove formed in said second holder member, such that said first holder member and said second holder member are locked in the enclosing condition, wherein in the unlocked position, said portion of said switch latch is disengaged from said locker groove, such that said first holder member and said second holder member are able to rotate from the enclosing condition toward the operable condition about said pivot unit, wherein in the detachable position, said first holder member and said second holder member are able to be rotated with respect to each other about said pivot unit until said blade recess of said first holder member is accessible to outside and said blade holder is able to be removed from said blade recess for replacement of said blade.

5. The blade tool, as recited in claim 1, wherein said locker device further comprises a limiter arrangement configured to limit the predetermined included angle between said first holder member and said second holder member in the operable condition, wherein said limiter arrangement includes a slot formed in one of said first holder member and said second holder member that movably supports a switch latch and a limiting element formed on the other of said first holder member and said second holder member, wherein said limiting element is movably received within said slot during a rotation between said first holder member and said second holder member about said pivot unit, wherein engagement between said limiting element and at least one portion of said slot limits further rotation between said first holder member and said second holder member about said pivot unit.

6. The blade tool, as recited in claim 1, wherein said locker device comprises a switch latch supported by said first holder member, wherein said switch latch is movably mounted on said first holder member and guided by a switch slot formed in said first holder member, wherein said switch latch is movably relative to said first holder member between a locked position and an unlocked position, wherein in the locked position, a portion of said switch latch is engaged with a locker groove formed in said second holder member, such that said first holder member and said second holder member are locked in the enclosing condition, wherein in the unlocked position, said portion of said switch latch is disengaged from said locker groove, such that said first holder member and said second holder member are able to rotate from the enclosing condition toward the operable condition about said pivot unit.

7. The blade tool, as recited in claim 6, wherein said switch latch is further switchable to a detachable position, such that when said switch latch is switched to the detachable position, said first holder member and said second holder member are able to be rotated with respect to each other about said pivot unit until said blade recess of said first holder member is accessible to outside and said blade holder is able to be removed from said blade recess for replacement of said blade.

8. The blade tool, as recited in claim 7, wherein said blade recess of said first holder member is formed in said first holder member and defined by two parallel longitudinal walls and an end wall of said first holder member that collectively open toward said blade opening, wherein a stopper, formed at one end of said opening of said blade cavity, has a stopper surface formed facing said blade cavity, wherein said blade holder has a guiding side and a locking side parallel to said guiding side, wherein said blade holder has a holder width, between said guiding side and said locking side, equal to a recess width of said blade recess, such that said blade holder is able to slide within said blade cavity, wherein said blade holder has a holder end and an opposing stopping end configured in such a manner that when said blade holder is inwardly slid in said blade cavity until said holder end is rested against said end wall of said first holder member, said blade holder with said blade mounted thereon is received in said blade cavity and said blade holder is in a retracting condition, wherein said stopping end of said blade holder has a stopping surface such that when said blade holder is moving towards said opening of said blade cavity for extending said blade out of said blade cavity, said stopping surface of said blade holder is blocked by said stopper surface of said first holder member and said blade holder is in an extending condition.

9. The blade tool, as recited in claim 8, wherein said locker device comprises a locking button provided on an inner surface of said second holder member at a position close to an end of said blade cavity opposite said blade opening, and that said blade holder has a locking slot indented at an inner end of said locking side of said blade holder and a locking recess formed at an outer end of said locking side of said blade holder, wherein when said blade holder is in the retracting condition, said locking button is received in said locking recess so as to retain said blade holder in said blade cavity, wherein when said blade holder is extended to the extending condition, said blade holder is positioned by engagement between said stopper provided on said first holder member and said stopping surface of said blade holder, and said locking button is received in said locking slot, such that said blade holder is retained in the extending condition.

10. The blade tool, as recited in claim 9, wherein said first holder member has a switch slot formed between said pivot end and said blade recess thereof and said second holder member has a locker groove formed in an inner side thereof, wherein said locker groove has a locking groove shaped and sized to correspond to said switch slot of said first holder member and an unlocking groove, wherein said locking groove has a locking end located closer to said pivot end and an unlocking end curvedly extending from said locking end, wherein said unlocking groove is extended from a junction position located between said locking end and said unlocking end of said locking groove to a position adjacent to said unlocking end of said locking groove, wherein said switch latch has a connecting end pivotally connected to said first holder member and a switching end perpendicularly connected with a switch button which is extended through said switch slot and inserted into said locker groove, such that by rotating said switch latch about said connecting end thereof, said switch button is selectively movable between said unlocking end to place said switch latch in the unlocking position and said locking end to place said switch latch in the locking position, wherein when said switch button is switched to the junction position, said switch latch is in the detaching position.

11. The blade tool, as recited in claim 8, wherein said first holder member has a switch slot formed between said pivot end and said blade recess thereof and said second holder member has a locker groove formed in an inner side thereof, wherein said locker groove has a locking groove shaped and sized to correspond to said switch slot of said first holder member and an unlocking groove, wherein said locking groove has a locking end located closer to said pivot end and an unlocking end curvedly extending from said locking end, wherein said unlocking groove is extended from a junction position located between said locking end and said unlocking end of said locking groove to a position adjacent to said unlocking end of said locking groove, wherein said switch latch has a connecting end pivotally connected to said first holder member and a switching end perpendicularly connected with a switch button which is extended through said switch slot and inserted into said locker groove, such that by rotating said switch latch about said connecting end thereof, said switch button is selectively movable between said unlocking end to place said switch latch in the unlocking position and said locking end to place said switch latch in the locking position, wherein when said switch button is switched to the junction position, said switch latch is in the detaching position.

12. The blade tool, as recited in claim 7, wherein said first holder member has a switch slot formed between said pivot end and said blade recess thereof and said second holder member has a locker groove formed in an inner side thereof, wherein said locker groove has a locking groove shaped and sized to correspond to said switch slot of said first holder member and an unlocking groove, wherein said locking groove has a locking end located closer to said pivot end and an unlocking end curvedly extending from said locking end, wherein said unlocking groove is extended from a junction position located between said locking end and said unlocking end of said locking groove to a position adjacent to said unlocking end of said locking groove, wherein said switch latch has a connecting end pivotally connected to said first holder member and a switching end perpendicularly connected with a switch button which is extended through said switch slot and inserted into said locker groove, such that by rotating said switch latch about said connecting end thereof, said switch button is selectively movable between said unlocking end to place said switch latch in the unlocking position and said locking end to place said switch latch in the locking position, wherein when said switch button is switched to the junction position, said switch latch is in the detaching position.

13. The blade tool, as recited in claim 6, wherein said blade recess of said first holder member is formed in said first holder member and defined by two longitudinal parallel walls and an end wall of said first holder member that collectively open toward said blade opening, wherein a stopper, formed at one end of said opening of said blade cavity, has a stopper surface formed facing said blade cavity, wherein said blade holder has a guiding side and a locking side parallel to said guiding side, wherein said blade holder has a holder width, between said guiding side and said locking side, equal to a recess width of said blade recess, such that said blade holder is able to slide within said blade cavity, wherein said blade holder has a holder end and an opposing stopping end configured in such a manner that when said blade holder is inwardly slid in said blade cavity until said holder end is rested against said end wall of said first holder member, said blade holder with said blade mounted thereon is received in said blade cavity and said blade holder is in a retracting condition, wherein said stopping end of said blade holder has a stopping surface such that when said blade holder is moving towards said opening of said blade cavity for extending said blade out of said blade cavity, said stopping surface of said blade holder is blocked by said stopper surface of said first holder member and said blade holder is in an extending condition.

14. The blade tool, as recited in claim 13, wherein said locker device comprises a locking button provided on an inner surface of said second holder member at a position close to an end of said blade cavity opposite said blade opening, and that said blade holder has a locking slot indented at an inner end of said locking side of said blade holder and a locking recess formed at an outer end of said locking side of said blade holder, wherein when said blade holder is in the retracting condition, said locking button is received in said locking recess so as to retain said blade holder in said blade cavity, wherein when said blade holder is extended to the extending condition, said blade holder is positioned by engagement between said stopper provided on said first holder member and said stopping surface of said blade holder, and said locking button is received in said locking slot, such that said blade holder is retained in the extending condition.

15. The blade tool, as recited in claim 14, wherein said first holder member has a switch slot formed between said pivot end and said blade recess thereof and said second holder member has a locker groove formed in an inner side thereof, wherein said locker groove has a locking groove shaped and sized to correspond to said switch slot of said first holder member, wherein said locking groove has a locking end located closer to said pivot end and an unlocking end curvedly extending from said locking end, wherein said switch latch has a connecting end pivotally connected to said first holder member and a switching end perpendicularly connected with a switch button which is extended through said switch slot and inserted into said locker groove, such that by rotating said switch latch about said connecting end thereof, said switch button is selectively movable between said unlocking end to place said switch latch in the unlocking position and said locking end to place said switch latch in the locking position.

16. The blade tool, as recited in claim 13, wherein said first holder member has a switch slot formed between said pivot end and said blade recess thereof and said second holder member has a locker groove formed in an inner side thereof, wherein said locker groove has a locking groove shaped and sized to correspond to said switch slot of said first holder member, wherein said locking groove has a locking end located closer to said pivot end and an unlocking end curvedly extending from said locking end, wherein said switch latch has a connecting end pivotally connected to said first holder member and a switching end perpendicularly connected with a switch button which is extended through said switch slot and inserted into said locker groove, such that by rotating said switch latch about said connecting end thereof, said switch button is selectively movable between said unlocking end to place said switch latch in the unlocking position and said locking end to place said switch latch in the locking position.

17. The blade tool, as recited in claim 6, wherein said first holder member has a switch slot formed between said pivot end and said blade recess thereof and said second holder member has a locker groove formed in an inner side thereof, wherein said locker groove has a locking groove shaped and sized to correspond to said switch slot of said first holder member, wherein said locking groove has a locking end located closer to said pivot end and an unlocking end curvedly extending from said locking end, wherein said switch latch has a connecting end pivotally connected to said first holder member and a switching end perpendicularly connected with a switch button which is extended through said switch slot and inserted into said locker groove, such that by rotating said switch latch about said connecting end thereof, said switch button is selectively movable between said unlocking end to place said switch latch in the unlocking position and said locking end to place said switch latch in the locking position.

18. The blade tool, as recited in claim 1, wherein said blade recess of said first holder member is formed in said first holder member and defined by two parallel longitudinal walls and an end wall of said first holder member that collectively open toward said blade opening, wherein said blade holder has a guiding side and a locking side parallel to said guiding side, wherein said blade holder has a holder width, between said guiding side and said locking side, equal to a recess width of said blade recess, such that said blade holder is able to slide within said blade cavity, wherein said locker device comprises a locking button provided on an inner surface of said second holder member at a position close to an opposing end of said opening of said blade cavity, and that said blade holder has a locking slot indented at an inner end of said locking side of said blade holder and a locking recess formed at an outer end of said locking side of said blade holder, such that when said blade holder is retracted to a retracting condition, said locking button is engaged in said locking recess so as to block and lock said blade holder to be retained in said blade cavity, wherein when said blade holder is extended to an extending condition, said locking button is engaged with said locking slot and said blade holder is locked in the extending condition.

19. The blade tool, as recited in claim 1, wherein said blade recess of said first holder member is formed in said first holder member and defined by two parallel longitudinal walls and an end wall of said first holder member that collectively open toward said blade opening, wherein a stopper, formed at one end of said opening of said blade cavity, has a stopper surface formed facing said blade cavity, wherein said blade holder has a guiding side and a locking side parallel to said guiding side, wherein said blade holder has a holder width, between said guiding side and said locking side, equal to a recess width of said blade recess, such that said blade holder is able to slide within said blade cavity, wherein said blade holder has a holder end and an opposing stopping end configured in such a manner that when said blade holder is inwardly slid in said blade cavity until said holder end is rested against said end wall of said first holder member, said blade holder with said blade mounted thereon is received in said blade cavity and said blade holder is in a retracting condition, wherein said stopping end of said blade holder has a stopping surface such that when said blade holder is moving towards said opening of said blade cavity for extending said blade out of said blade cavity, said stopping surface of said blade holder is blocked by said stopper surface of said first holder member and said blade holder is in an extending condition.

20. The blade tool, as recited in claim 19, wherein said locker device comprises a locking button provided on an inner surface of said second holder member at a position close to an end of said blade cavity opposite said blade opening, and that said blade holder has a locking slot indented at an inner end of said locking side of said blade holder and a locking recess formed at an outer end of said locking side of said blade holder, wherein when said blade holder is in the retracting condition, said locking button is received in said locking recess so as to retain said blade holder in said blade cavity, wherein when said blade holder is extended to the extending condition, said blade holder is positioned by engagement between said stopper provided on said first holder member and said stopping surface of said blade holder, and said locking button is received in said locking slot, such that said blade holder is retained in the extending condition.

* * * * *